United States Patent
Krief et al.

(10) Patent No.: US 7,772,535 B2
(45) Date of Patent: Aug. 10, 2010

(54) METHOD OF CAPTURING A FOCUSED IMAGE VIA AN OBJECTIVE OF A MICROSCOPY DEVICE

(75) Inventors: Bruno Krief, Toulouse (FR); Raphaël Marcelpoil, Grenoble (FR)

(73) Assignee: TriPath Imaging, Inc., Burlington, NC (US)

( * ) Notice: Subject to any disclaimer, the term of this patent is extended or adjusted under 35 U.S.C. 154(b) by 131 days.

(21) Appl. No.: 12/172,723

(22) Filed: Jul. 14, 2008

(65) Prior Publication Data

US 2008/0272274 A1    Nov. 6, 2008

Related U.S. Application Data

(62) Division of application No. 11/425,605, filed on Jun. 21, 2006, now Pat. No. 7,417,213.

(60) Provisional application No. 60/692,761, filed on Jun. 22, 2005.

(51) Int. Cl.
  *H01L 27/00* (2006.01)
(52) U.S. Cl. .................. 250/208.1; 250/201.2
(58) Field of Classification Search .............. 250/208.1, 250/201.2–201.5, 216, 306, 307, 461.2; 382/128–133, 382/260; 356/71–73, 244, 401, 402; 359/391, 359/398
  See application file for complete search history.

(56) References Cited

U.S. PATENT DOCUMENTS

| | | | |
|---|---|---|---|
| 5,790,710 A | 8/1998 | Price et al. | |
| 5,912,699 A | 6/1999 | Hayenga et al. | |
| 5,995,143 A | * 11/1999 | Price et al. | ........... 348/345 |
| 6,640,014 B1 | 10/2003 | Price et al. | |
| 7,151,246 B2 | 12/2006 | Fein et al. | |
| 7,248,282 B2 | 7/2007 | Maddison | |
| 7,463,761 B2 | 12/2008 | Eichhorn et al. | |
| 2003/0091221 A1 | 5/2003 | Marcelpoil et al. | |
| 2003/0138140 A1 | 7/2003 | Marcelpoil et al. | |
| 2004/0218263 A1 | 11/2004 | Brugal | |
| 2004/0223632 A1 | 11/2004 | Olszak | |
| 2004/0228520 A1 | 11/2004 | Dresser et al. | |

FOREIGN PATENT DOCUMENTS

WO  WO 96/01438 A1  1/1996
WO  WO 03/073365 A1  9/2003

* cited by examiner

*Primary Examiner*—Que T Le
(74) *Attorney, Agent, or Firm*—Alston & Bird LLP

(57) ABSTRACT

A method of capturing a focused image of a continuously moving slide/objective arrangement is provided. A frame grabber device is triggered to capture an image of the slide through an objective at a first focus level as the slide continuously moves laterally relative to the objective. Alternatingly with triggering the frame grabber device, the objective is triggered to move to a second focus level after capture of the image of the slide. The objective moves in discrete steps, oscillating between minimum and maximum focus levels. The frame grabber device is triggered at a frequency as the slide continuously moves laterally relative to the objective so multiple images at different focus levels overlap, whereby a slide portion is common to each. The image having the maximum contrast value within overlapping images represents an optimum focus level for the slide portion, and thus the focused image. Associated apparatuses and methods are also provided.

2 Claims, 19 Drawing Sheets

Highest contrast image stack extraction.

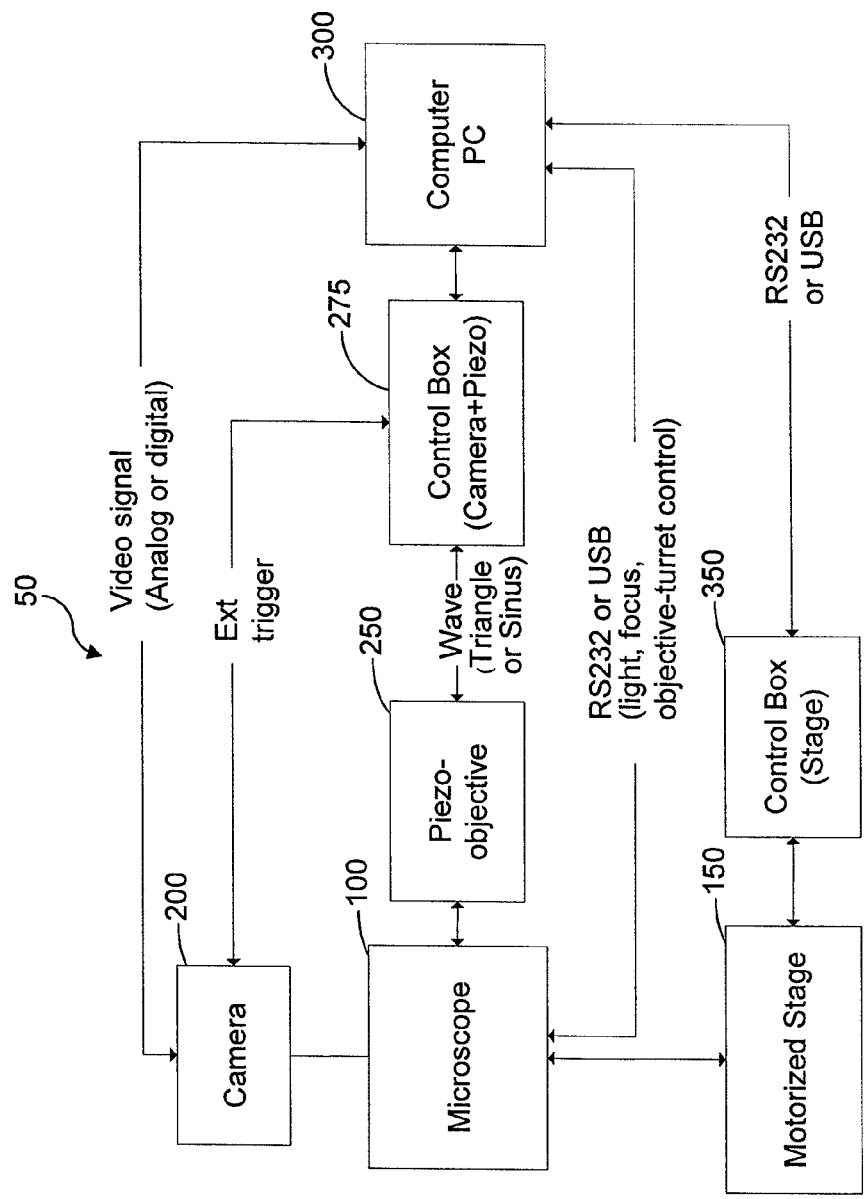
Figure 1: Device Block diagram.

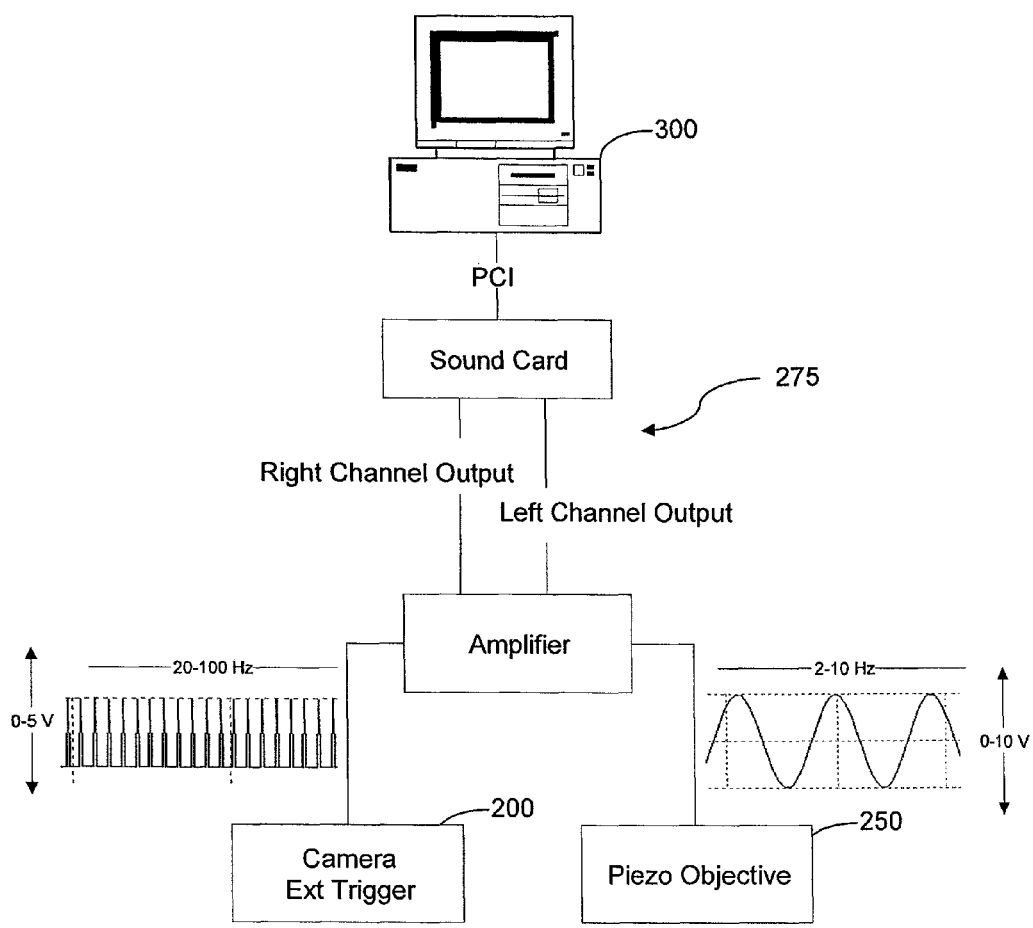
Figure 2: Oscillation control box

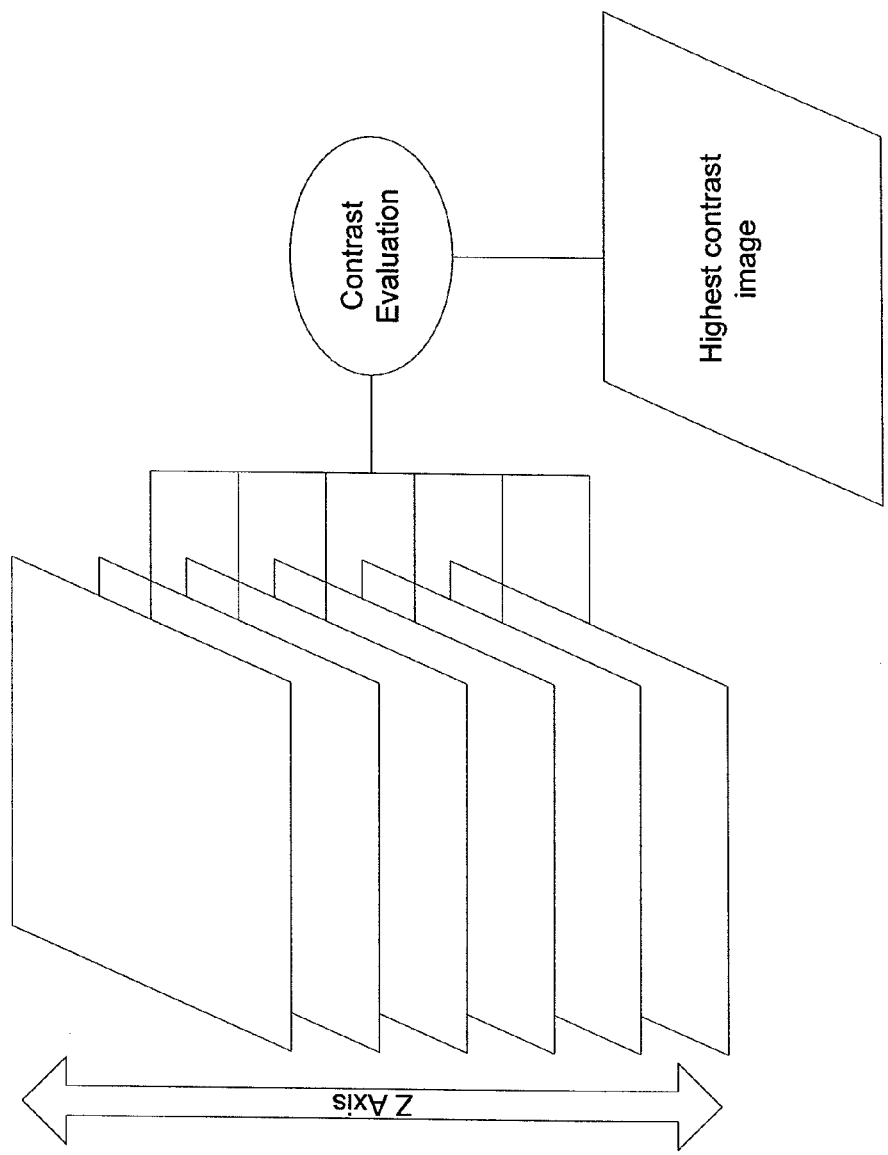
Figure 3: Highest contrast image stack extraction.

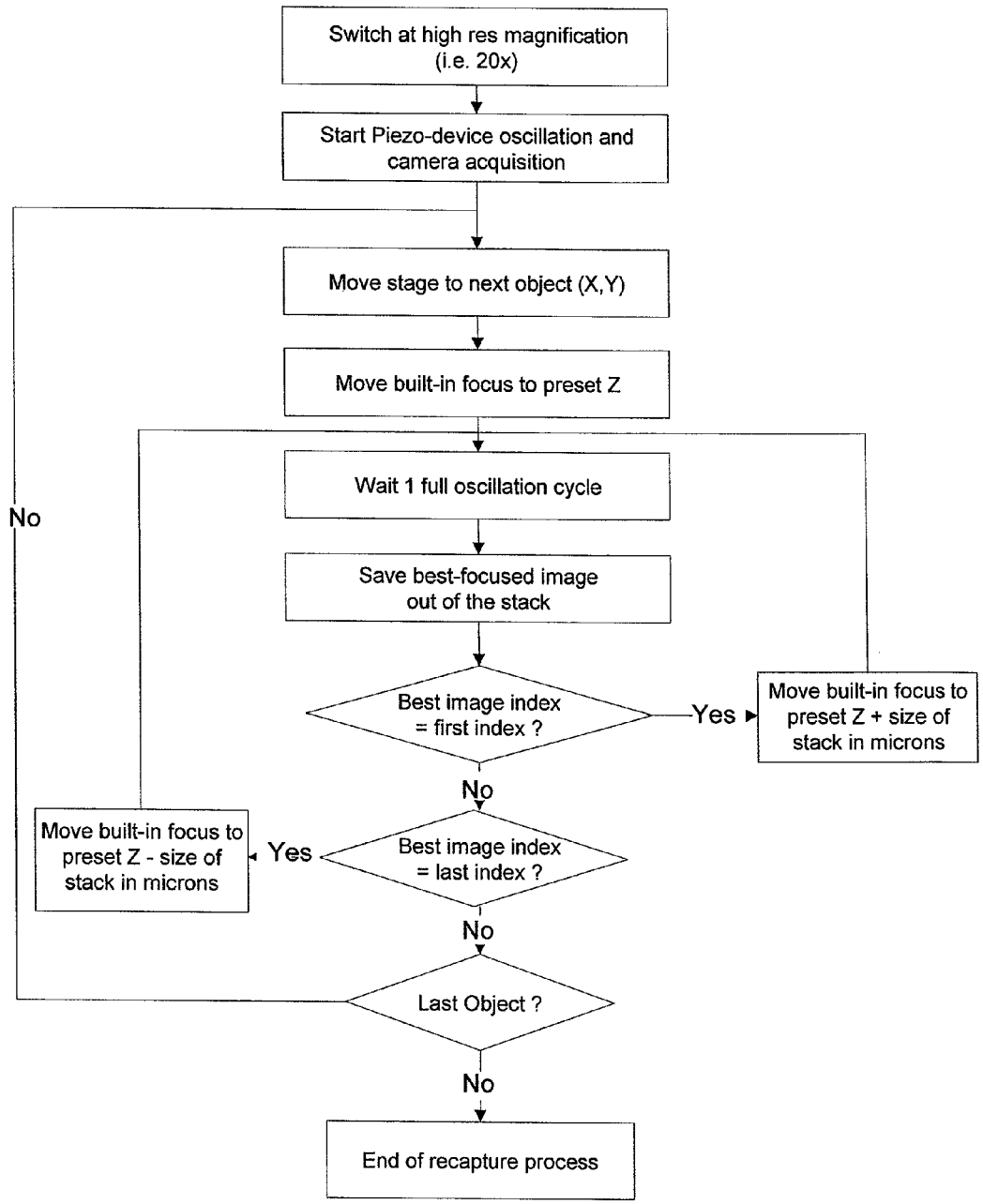
Figure 4: High-res recapture algorithm

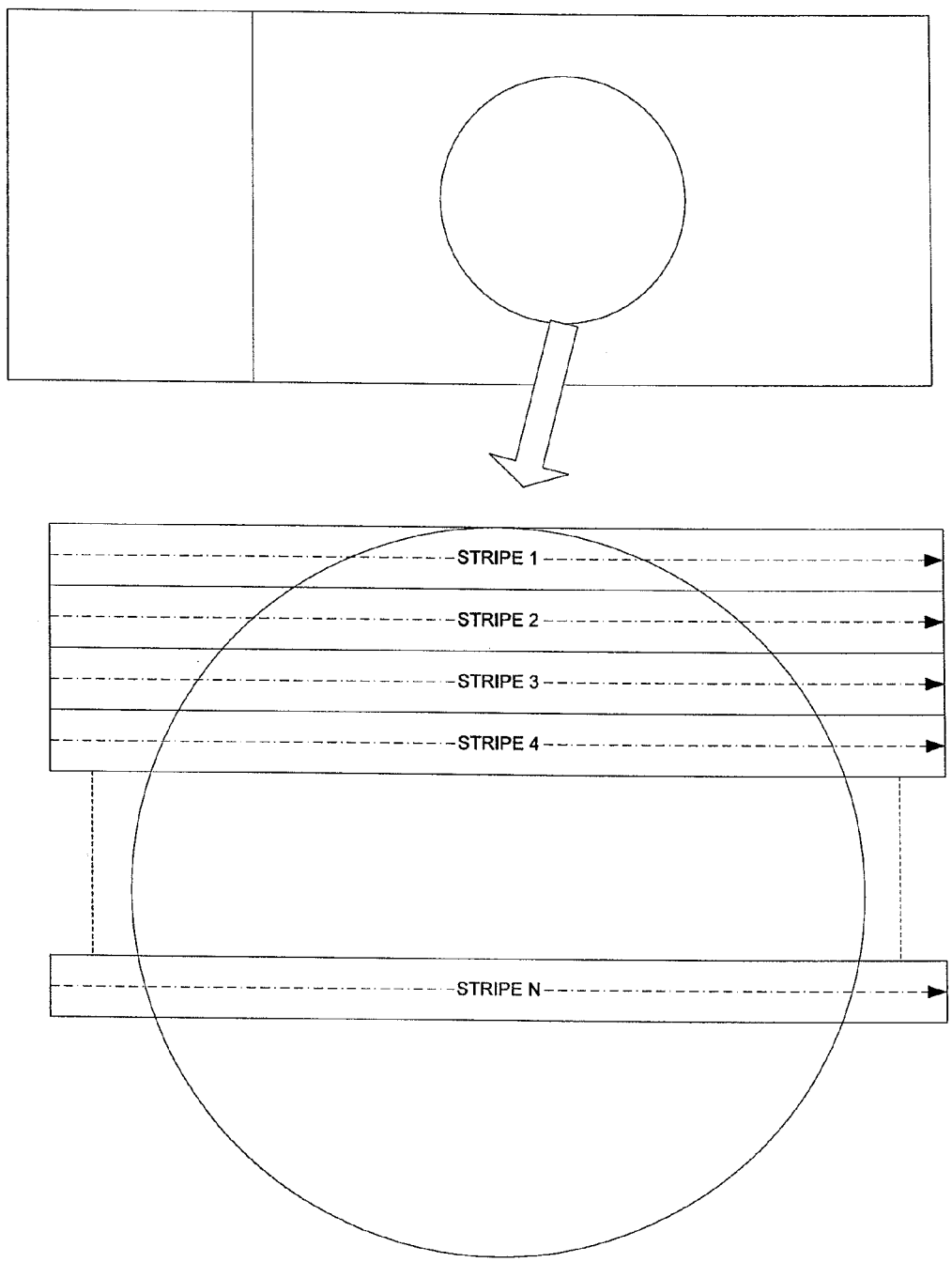
Figure 5 : Slide scanning by band (or stripe)

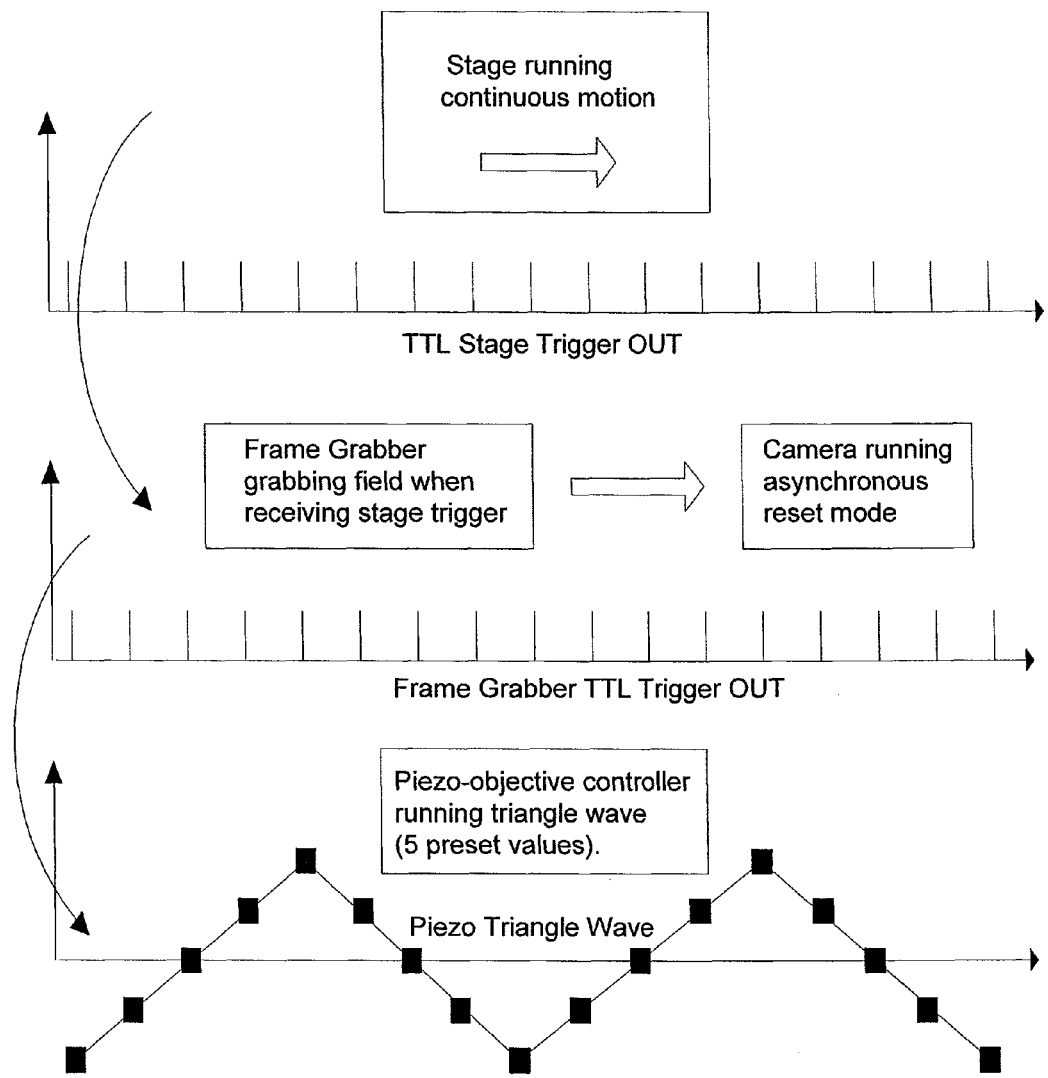
Figure 6: Trigger flow chart

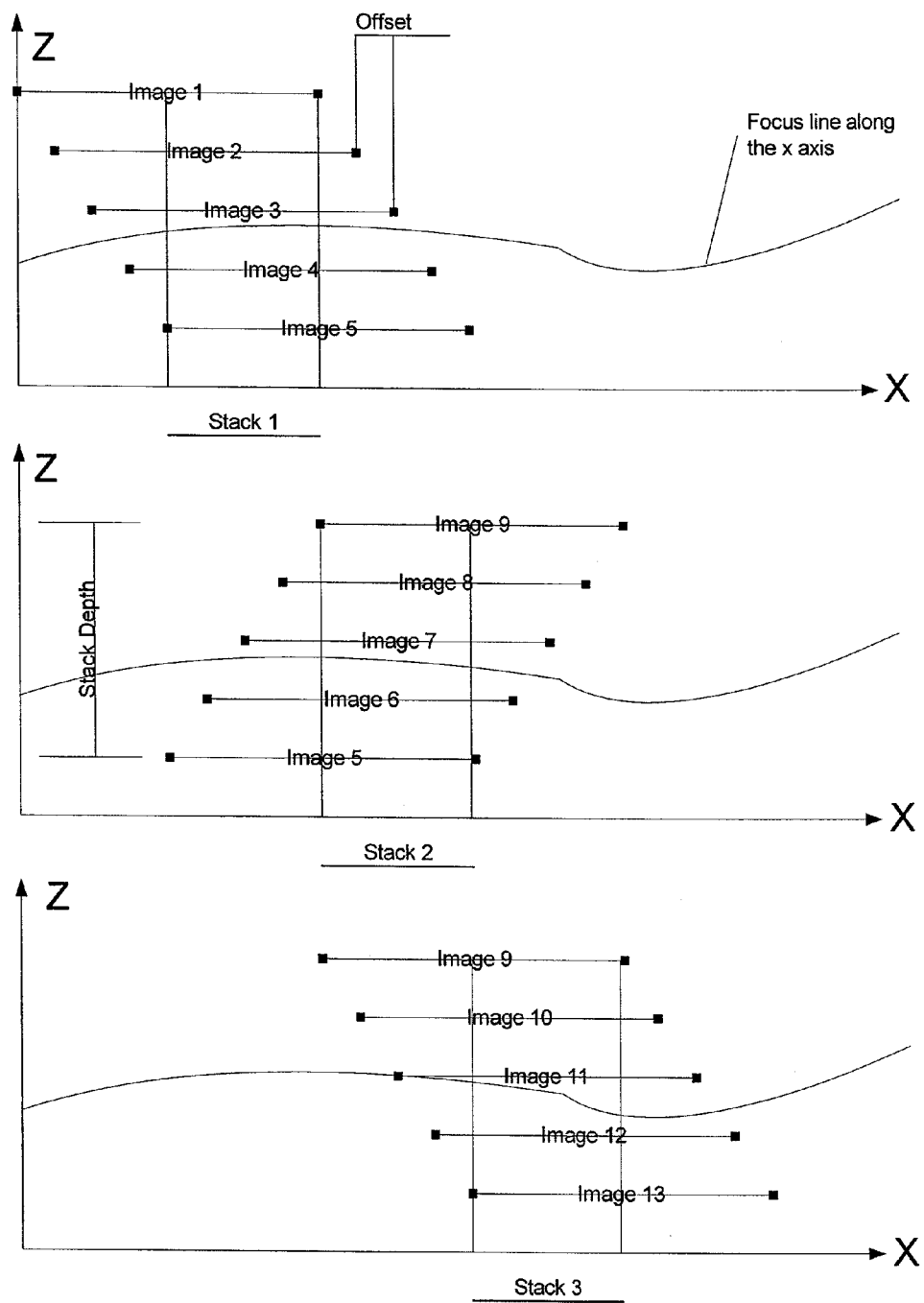
Figure 7 : Continuous motion stacking

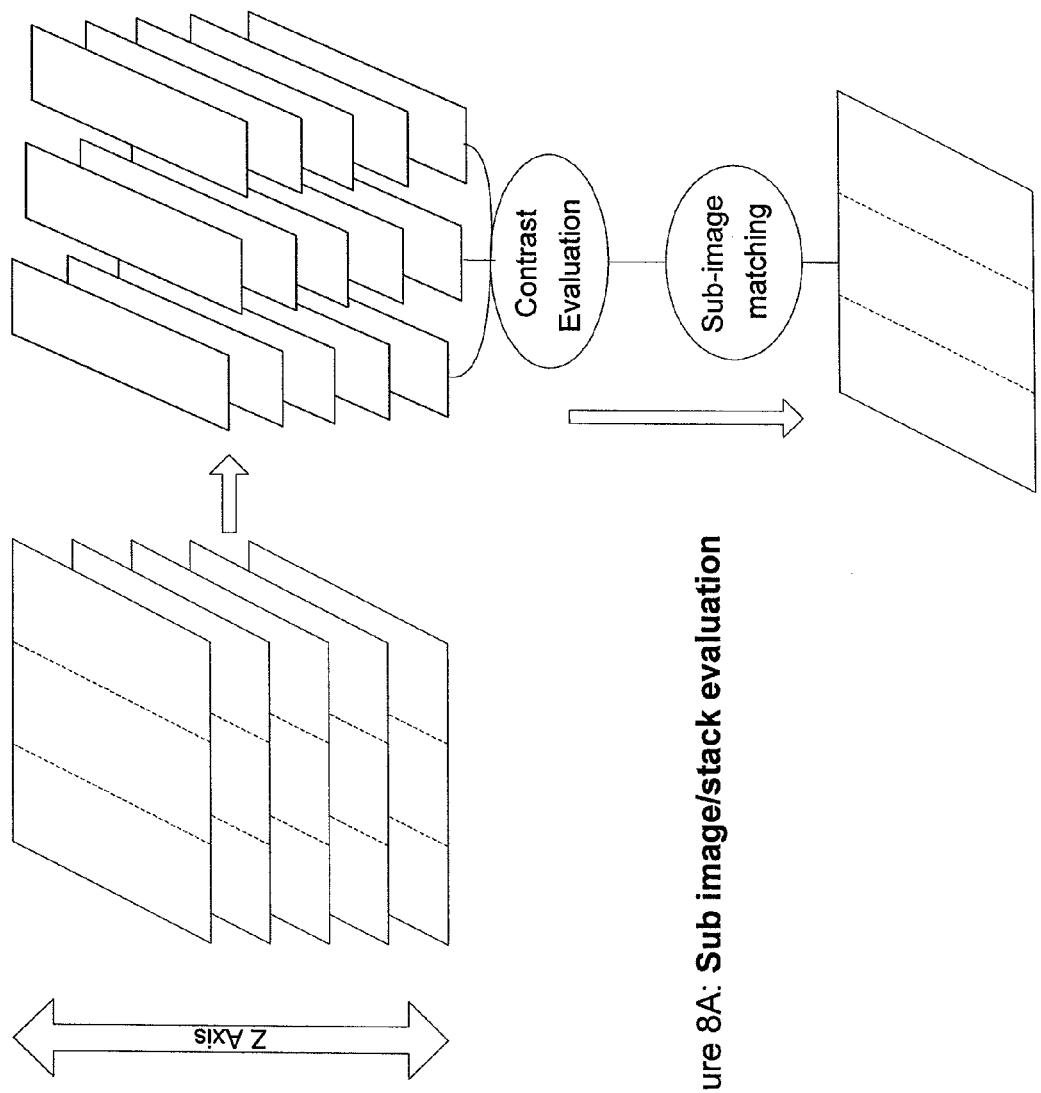
Figure 8A: Sub image/stack evaluation

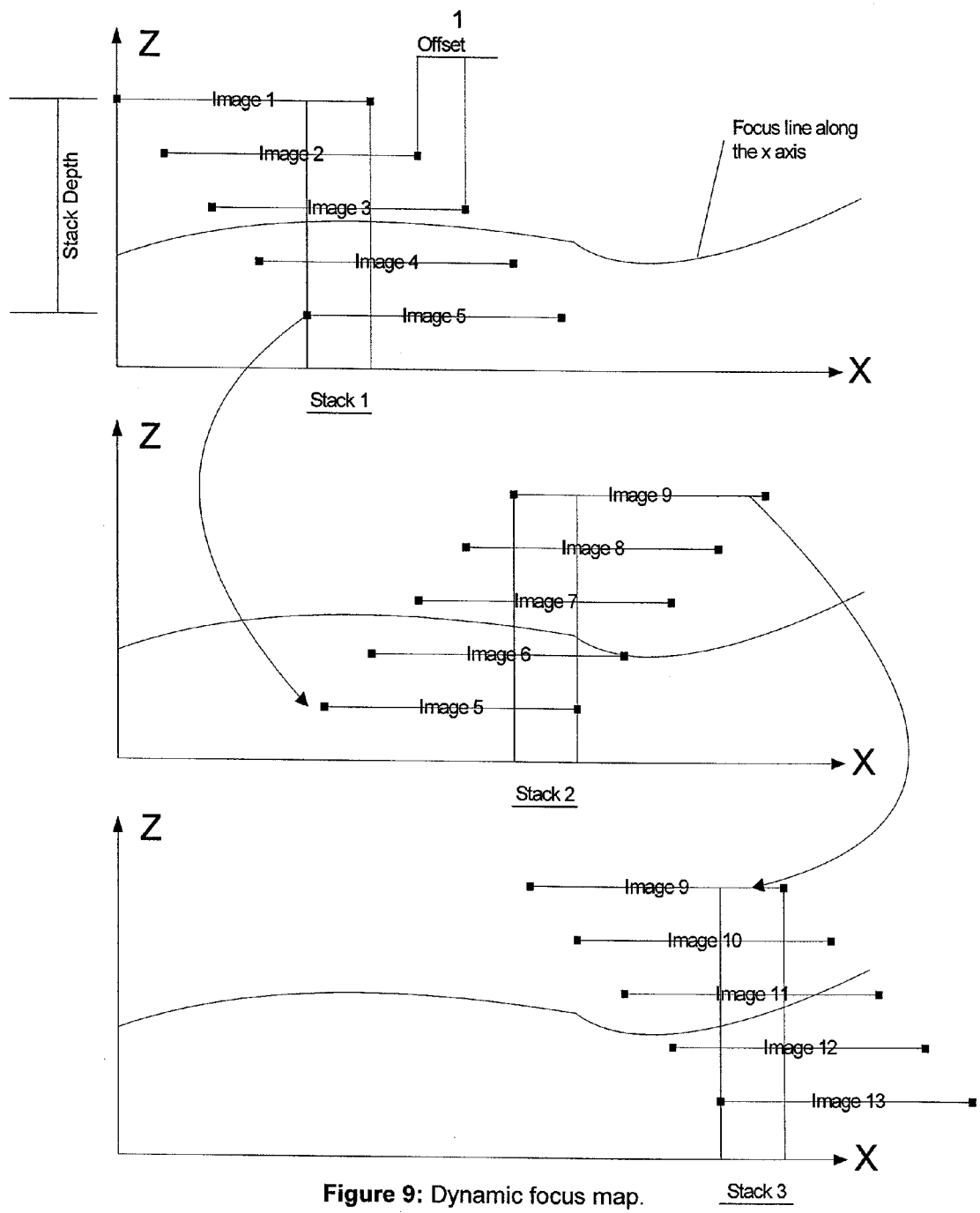
Figure 9: Dynamic focus map.

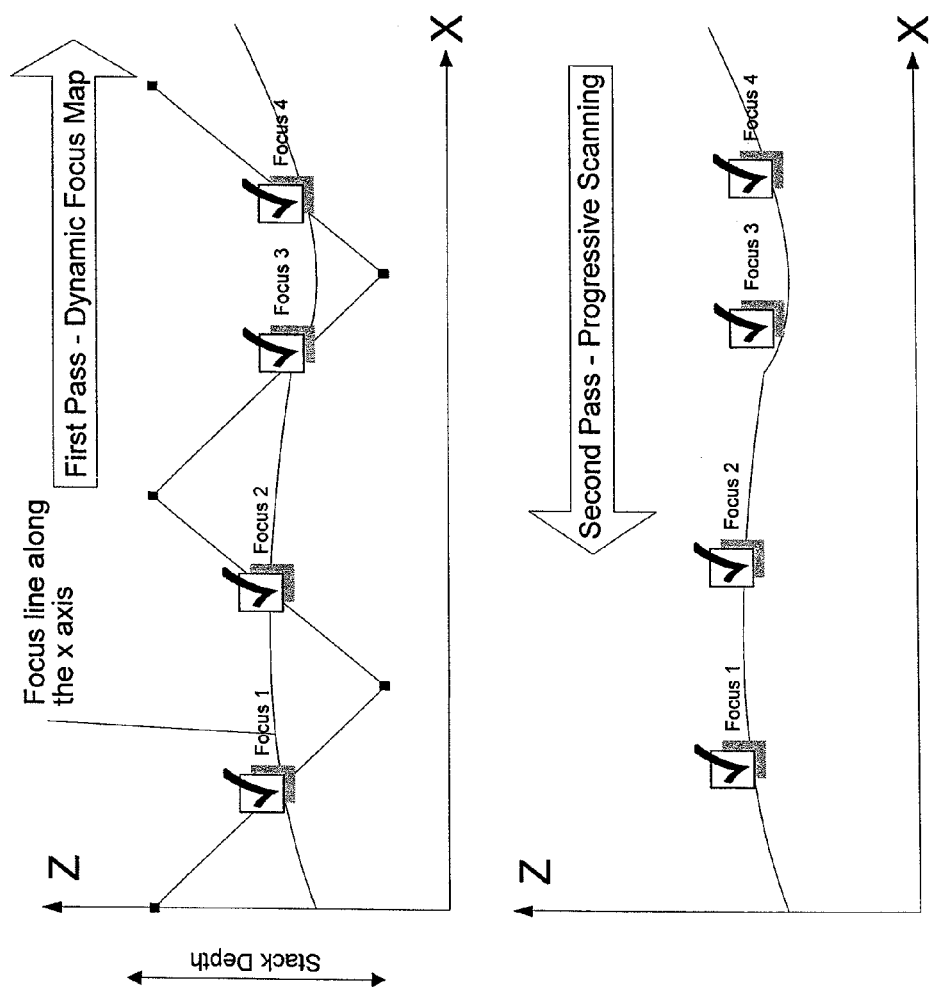
Figure 10: Dual Pass scanning.

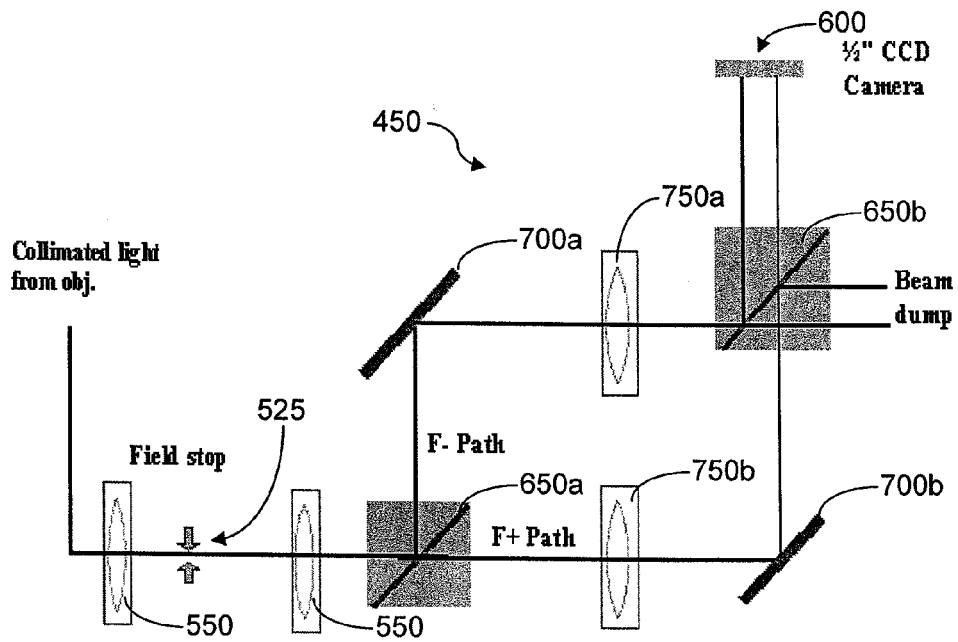
Figure 11: Simplified optical design schema
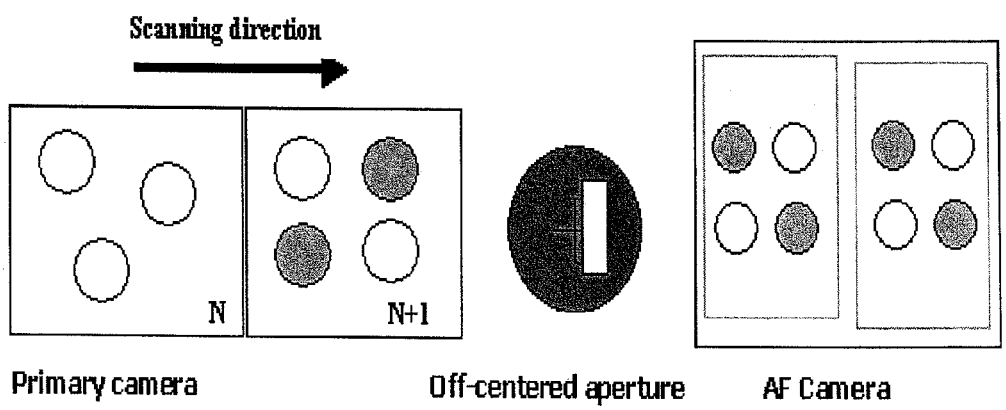
Figure 12: Predictive instant focus in mono-directional scanning; Primary and AF images are 90 degrees rotated.

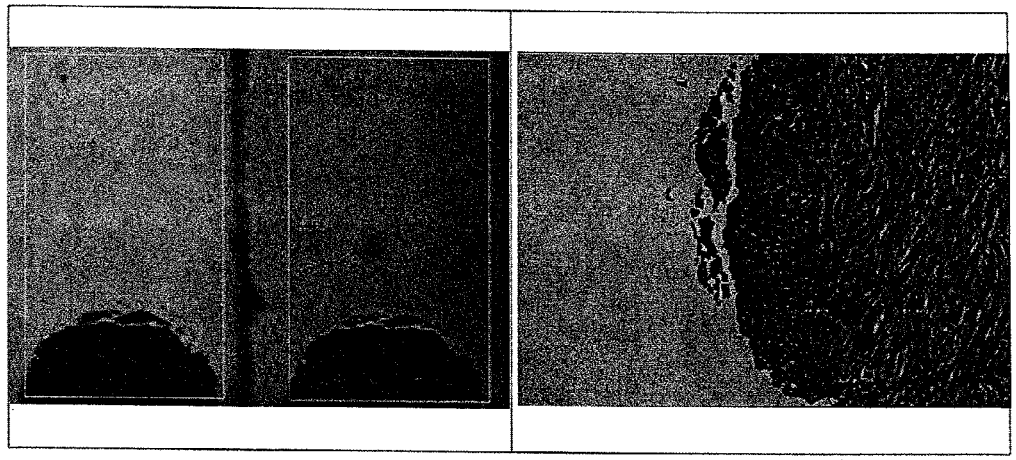
Figure 13: Adjusted AF zones (left side), corresponding RGB primary image (right side). Centered aperture.
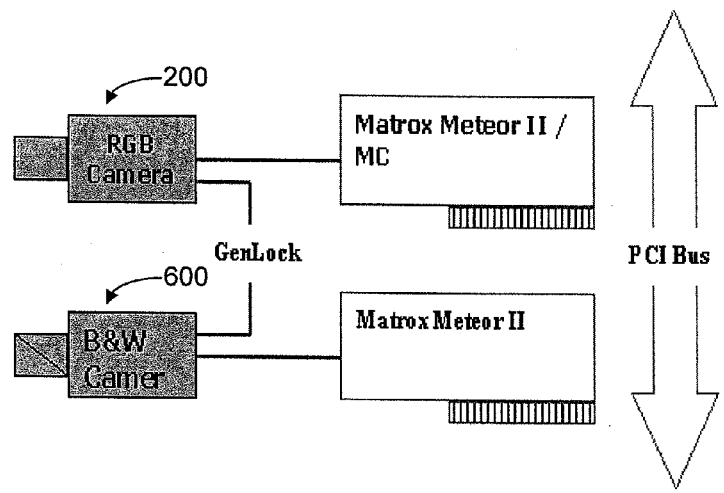
Figure 14: Image Acquisition architecture of the differential AF Module

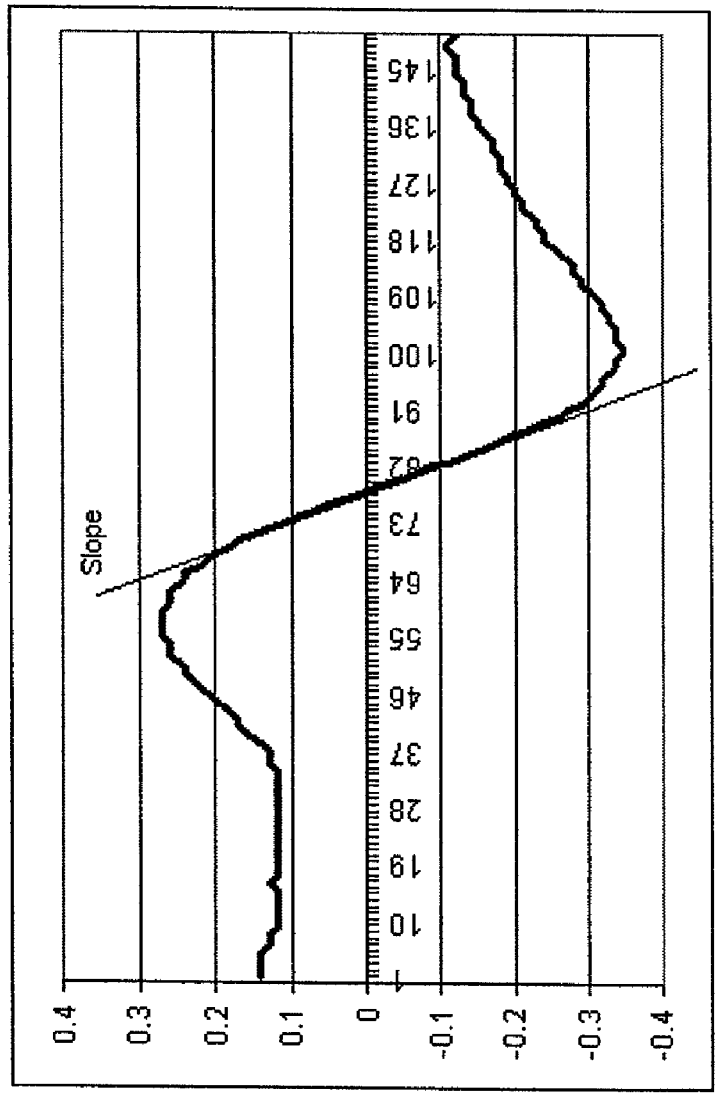
Figure 15: F+, F- and Contrast as a function of Z.

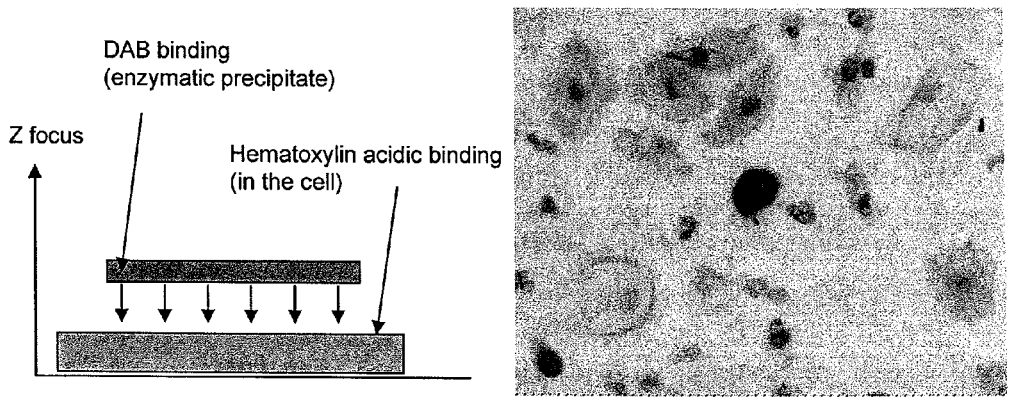
Figure 16: Schematic representation of multi-layer focus due to different dyes on cells of interest.
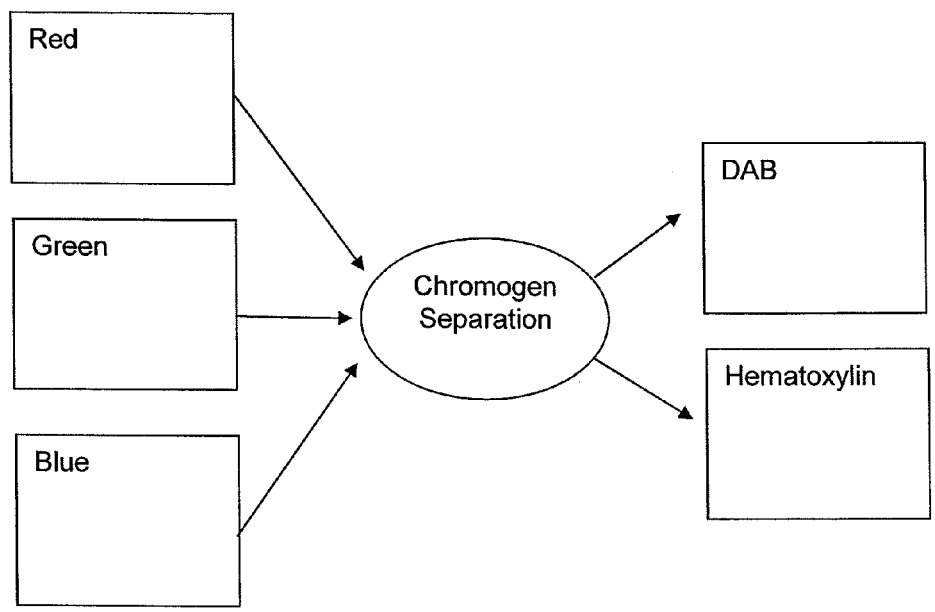
Figure 17: Schematic chromogen separation technique. Creation of 2 dyes (DAB and Hematoxylin) images (256 grey levels) out of a RGB color image.

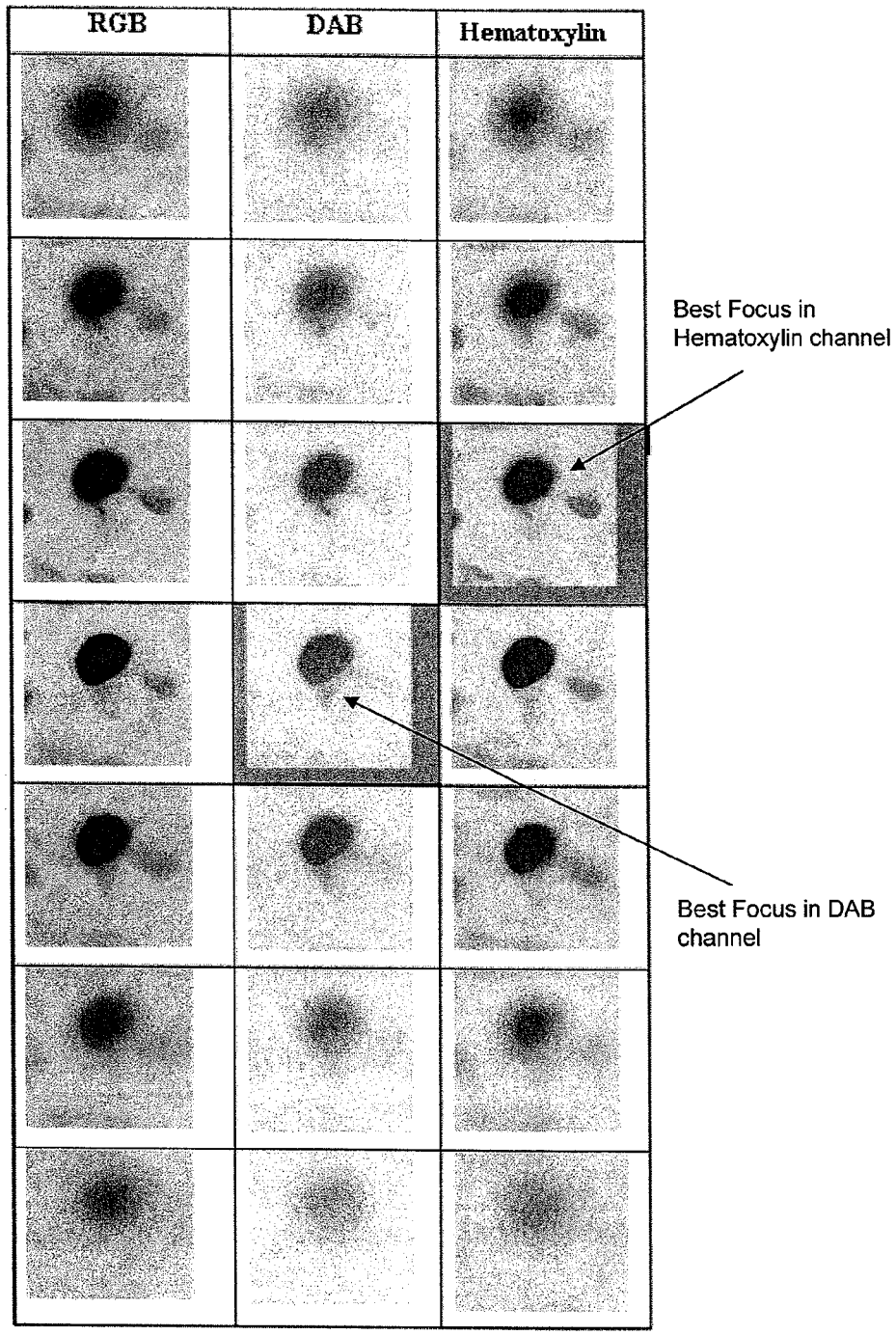
Figure 18A: Focus evaluation in each individual dyes (DAB and Hematoxylin). DAB and Hematoxylin thumbnails are 256 grey levels images shown in pseudo colors.

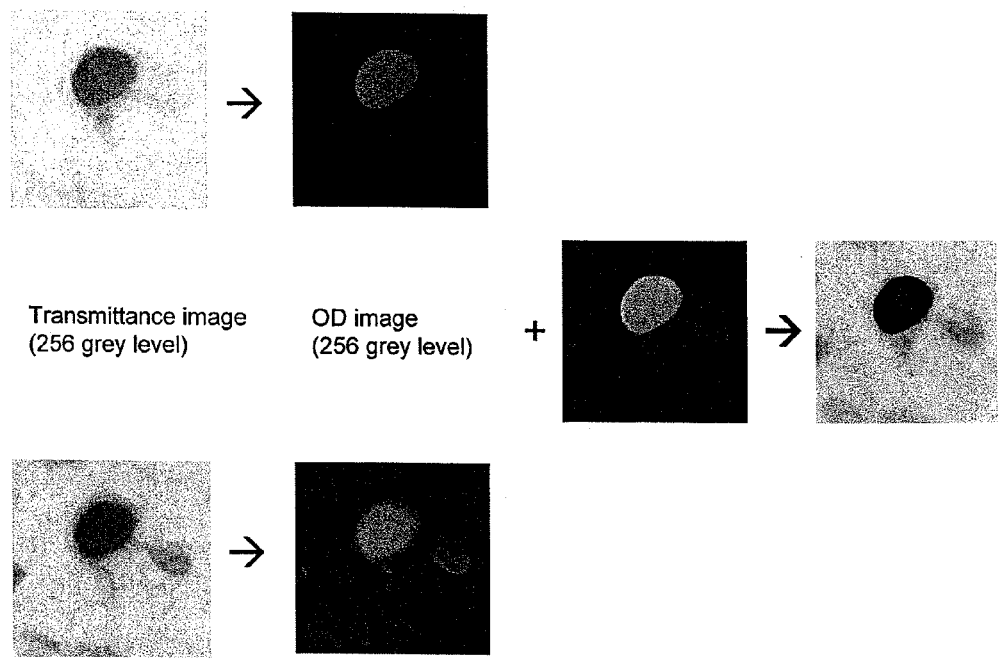
Figure 18B: Applying Lambert-Beer law to sum OD transformed best focus image in each dye channel and applying reverse OD to transmittance transformation.
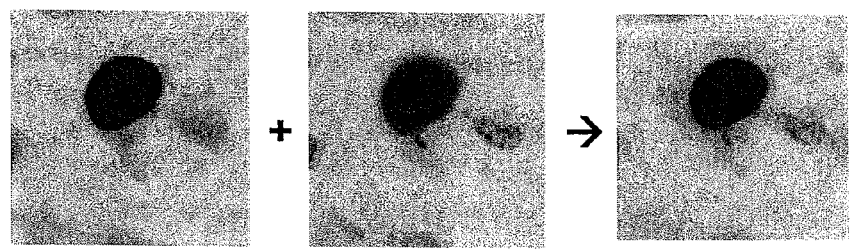
Figure 19: Appling "Extended Focus" algorithm to combine corresponding RGB best focus image in each dye channel.

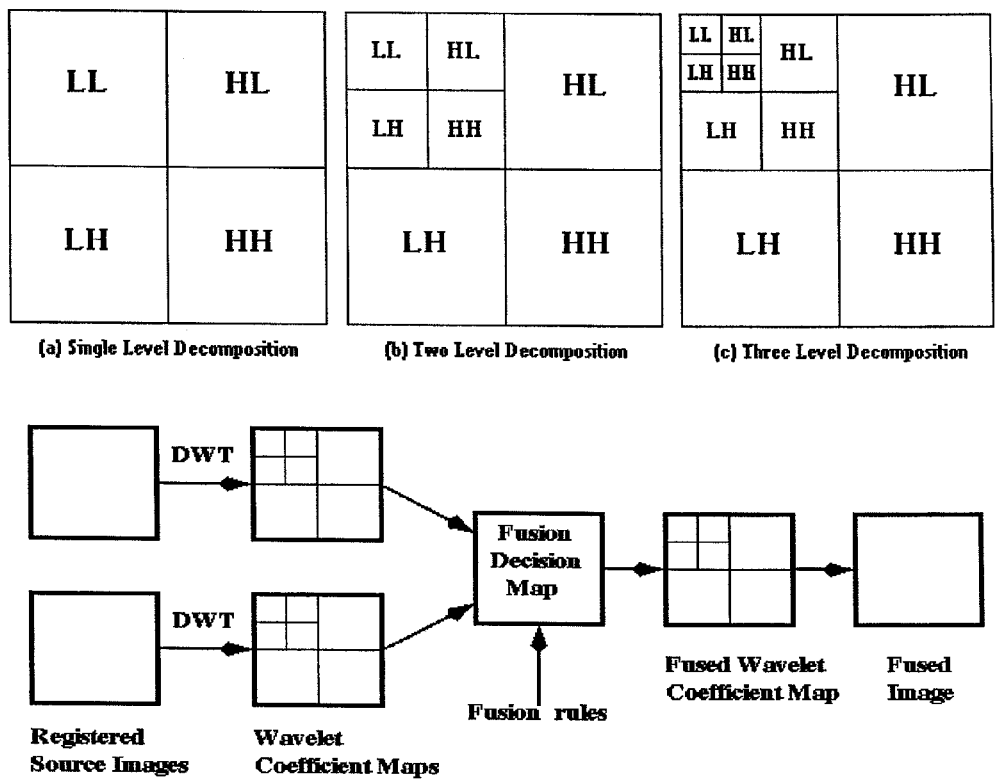
Figure 20: (a) Digital Wavelet Transform (3 level decomposition). The low frequency components (smooth variations) constitute the base of an image, and the high frequency components (the edges which give the detail) add upon them to refine the image, thereby giving a detailed image, (b) Generic fusion rule.

METHOD OF CAPTURING A FOCUSED IMAGE VIA AN OBJECTIVE OF A MICROSCOPY DEVICE

CROSS-REFERENCE TO RELATED APPLICATIONS

This application is a divisional application of U.S. application Ser. No. 11/425,605, filed Jun. 21, 2006, now U.S. Pat. No. 7,417,213, which claims the benefit of U.S. Provisional Application No. 60/692,761, filed Jun. 22, 2005, which are incorporated by reference herein in their entirety.

BACKGROUND OF THE INVENTION

1. Field of the Invention

The present invention relates to apparatuses and methods for the rapid focusing and acquisition of images of objects and areas of interest on a microscope slide.

2. Description of Related Art

Microscopic analysis is a widely used tool for research and routine evaluations, particularly in the field of cellular biology, cytology and pathology. Tissue samples and cell preparations are visually inspected by pathologists under several different conditions and test procedures, through the use of a microscope. Based on such a visual inspection by the pathologist, determinations concerning the tissue or cellular material can be made. For example, in cancer detection and research, microscopic analysis aids in the detection and quantification of genetic alterations and/or anomalies that appear related to the cause and progression of cancer, such as changes of expression of specific genes in form of DNA or messenger RNA (gene amplification, gene deletion, gene mutation), or the encoded protein expression. These alterations/anomalies can either be assessed in microscopic slides specifically prepared to present individual cells, as is the standard procedure in cytology, or whole histological sections or Tissue Micro Arrays can be evaluated.

Although numerous other suitable laboratory techniques or analyses exist, microscopy is routinely used because it is an informative technique, allowing rapid investigations at the cellular and sub-cellular levels, while capable of being expeditiously implemented at a relatively low cost. However, in order to overcome, for example, subjectivity and/or repeatability limitations of conventional microscopy, improved analysis devices combined the microscope with automatic image analysis provisions. Such improved devices include, for example, interactive systems, automatic scanning devices, and virtual slide scanners.

Interactive systems usually don't change the workflow of the pathologist analyzing and interpreting slides underneath the microscope. Typically, such interactive systems allow the potential for extracting additional quantitative information from the slide via image analysis and, therefore, possibly improve the reproducibility and the interpretation results of the operator. Better tools for reporting and documenting analysis results may also be realized. If properly configured, interactive systems are relatively fast and cost efficient, but the impact of such interactive systems on routine workflow is relatively small.

Automatic rare event detection devices are typically set up in a way that the whole analysis of the slides is done by the system in a totally unsupervised manner, from the loading of the slides onto the scanning stage to the final reporting of the results. Such automatic systems usually scan the slides, automatically identify objects or areas of interest for the analysis, quantitatively assess the targets, and report and document the results. The routine workflow for the pathologist or cytotechnologist in general is changed drastically, from a labor-intensive screening task to the interpretation of analysis results. However, such automatic systems are normally quite expensive, so that a relatively high annual volume of slides must be processed to cost-justify the acquisition of such a device.

Virtual slide scanning systems have been developed to automatically acquire large overview images at different optical resolutions. Such overview images can be far larger than the individual FOVs as they can be seen in the microscope.

One common factor relating these three applications mentioned above, namely interactive systems, automatic scanning devices, and virtual slide scanners, is that each requires a specific focusing technique for focusing an image, such as a digital image. For interactive applications, the operator usually manually focuses the image by visual inspection using the fine and coarse focus knobs of the microscope. However, in some instances, it is possible to implement a more sophisticated approach based on an auto-focus algorithm using the camera and the motorized Z drive of the microscope. In the interactive mode, the constraints are relatively small since the image to be focused is static and the speed at which the image must be focused is not critical, unless the focusing is a background process. Different methods are available to implement generic auto-focus algorithms, such as, for example, z-stacking or hill-climbing. These methods are based on the selection of the image presenting the highest contrast, where digital operators such as the variance, the entropy, and the LaPlacian, evaluate the image contrast to determine the highest contrast for optimum focus.

Another method of operating the imaging system is the automatic rare event detection mode. First, a slide is automatically moved to a motorized stage via a slide handler and a bar code on the slide is read by a bar code reader. Any objects of interest are automatically identified based on a predefined criteria and a low-resolution continuous motion scan of the region of interest (ROI) on the slide. The ROI can be determined based on a priori knowledge and is typically a part of a slide or a specific cell deposition area, defined through a preparation process (e.g. a liquid based preparation), or the ROI can be the whole slide. Objects identified during the first scan are then automatically re-located on the slide and respective images thereof acquired at high resolution. The high resolution image(s) can then be displayed in an image gallery for local or remote pathologist review.

For such rare event detection mode, the speed at which the slide is scanned and objects of interest re-located is critical to an effective system. When a low power objective is used for low-resolution scanning (i.e. 5×/0.15 NA) auto-focusing may not be necessary since the depth-of-field at such low resolution is large enough to include the focus plane of the specimen. However, the slide tilt must be evaluated and compensated for during the scanning. When higher power objectives (i.e. 10×/0.3 NA or 20×/0.5 NA) are used, the depth-of-field is small, and any acquired digital images must include a pre-focusing of the field of view. A z-stacking or hill-climbing approach is possible only when the scanning of the slide involves a stop-and-go mode of operation. That is, the system must stop the scan, obtain a focus and acquire the image, and then restart the scan. This mode of operation leads to impractically large scanning times. A progressive scan mode may be one alternative to gain slide scanning speed, but such a mode requires a specific focusing strategy capable of cooperating and functioning with the continuous scanning motion.

In the re-location mode for regions or objects of interest (for example, particular fields of view or individual objects, e.g. cells) a fast auto-focus is generally required. However, for auto-focusing on individual objects or regions, known z-stacking or hill-climbing techniques may be sufficient. The automatic re-location of detected objects of interest at high resolution requires efficient focusing in order to present useful images in the image gallery for local or remote review. Certain types of applications require the recapture of numerous objects of interest and, as such, the amount of time spent for this task is critical. Z-stacking or hill-climbing focusing methods must therefore be optimized to reduce the time spent during recapture if such focusing methods are to be sufficient.

The virtual slide scan mode relates to the acquisition and quantitative evaluation of ROI's, which are larger than individual FOV's, and may include the complete slide. The time constraints in this mode are generally the same, if not higher than, the rare event detection scanning mode. Therefore, a progressive scanning approach with an appropriate focusing method may be best suited for such a situation.

In this regard, U.S. Pat. No. 5,912,699 to Hayenga et al. discloses a method and apparatus for rapid capture of focused microscopic images, whereby specimen focus evaluation is conducted in a continuous scan motion. The Hayenga device is equipped with a camera assembly having 3 camera paths (primary camera, first and second focus camera) and a focus processor that evaluates the image focus in approximately real time at any position along the slide scanning path. The focus processor calculates a score based on the differential ratio $((F^- - F^+)/(F^- + F^+))$, where $F^-$ and $F^+$ are, respectively, the contrast evaluations of the image grabbed by the first and second focus cameras. However, such a camera assembly is optimized for a particular magnification and cannot readily be used for a different magnification setting.

U.S. Pat. No. 6,640,014 to Price et al. discloses a method of simultaneous multi-planar image acquisition. Particularly, an image of the specimen is captured as a three-dimensional (3D) volume, using an array of 9 TDI line scan cameras connected to the microscope via fiber optics. The focus is dynamically calculated, while a piezo-focus device updates the focus position according to a tracking algorithm. However, such a method presents two potential drawbacks: (i) the equipment costs tend to be very expensive; and (ii) the size of the 3D volume of the image (number of planes, distance between the planes) may be limited by hardware constraints.

U.S. Patent Application Publication No. US 2004/0223632A1 to Olszac discloses a method of best-focus evaluation in continuous motion slide scanning. The image sensor (array of lenses or an array of cameras) is tilted from the optical axis perpendicularly to the scanning direction (i.e. lateral scanning). At a given moment, the entire image sensor sees a scene (i.e. microscopic image) in which only the central line is in focus (assuming the device at mid-focus range) and the other lines correspond to focuses above and below the best-focus line. The position of the best-focus line will change as the specimen is scanned. The method thus described in this reference is used for pre-scanning the slide and basically serves as a focus map.

U.S. Patent Application Publication No. US 2004/0218263A1 to Brugal discloses a device for digital microscopy including a CMOS camera, a piezo-objective, a motorized stage, and a linear objective turret. However, no use of the system in a continuous motion image acquisition procedure is disclosed.

Thus, there exists a need for a method and apparatus for rapid focusing of an imaging system for obtaining a microscopic image, which can be used for static high-resolution object recapture as well as for continuous motion high resolution image focusing. Such an apparatus and method should desirably be relatively cost effective, have relatively little and/or simple equipment requirements, and be readily adaptable to various magnifications. In addition, the size of the image that can be obtained preferably should not be limited by hardware constraints. Such a rapid focusing methodology should also be readily adaptable to a sample exhibiting different focal planes, as well as to focusing considerations encountered in image analyses implementing chromogen separation techniques.

BRIEF SUMMARY OF THE INVENTION

The above and other needs are met by the present invention which, in one embodiment, provides a method of capturing a focused image, through an objective, of a slide on a stage. At least one of the objective and the slide is configured to continuously move with respect to the other. Such a method comprises triggering a frame grabber device to capture an image of a portion of the slide through the objective as the slide moves laterally with respect to the objective, wherein the objective is disposed at a first focus level with respect to the slide. Alternatingly with the step of triggering a frame grabber device, the objective is triggered to move to a second focus level with respect to the slide after the image of the portion of the slide has been captured. The objective is movable in discrete steps in a range of focus levels, oscillating back and forth between a minimum focus level and a maximum focus level, wherein the range of focus levels includes the first and second focus levels. The frame grabber device is triggered at a frequency as the slide moves laterally with respect to the objective so that multiple images at different focus levels overlap and such that the portion of the slide is common to each of the multiple images, wherein each image has a contrast value. The image having a maximum contrast value within the plurality of overlapping images is then determined, with the maximum contrast image thereby representing an optimum focus level for the portion of the slide, and thus the focused image.

Another aspect of the present invention comprises a method of forming a focused image of a slide on a stage. Such a method includes identifying objects of interest in a specified-area image of a slide, wherein the specified-area image have an image-wide maximum contrast corresponding to a image-wide focus level for the specified-area image, and then sorting the objects of interest according to a criteria. A local contrast evaluation for each of the sorted objects of interest is performed from local images of the object of interest captured at discrete focus levels about the image-wide maximum contrast focus level so as to form an image stack index for each of the sorted objects of interest. Each image stack index includes one of the local images at a focus level corresponding to a local maximum contrast for the respective object of interest. A pixel from the local maximum contrast local image of one of the sorted objects of interest is substituted for the corresponding pixel in the specified-area image having the image-wide contrast level so as to form a fused image, wherein the fused image is thereby configured to bring each of the sorted objects of interest in the specified-area image into focus. A low-pass filter is then applied to the fused image to reduce any local step effects around any of the sorted objects of interest brought into focus.

Yet another aspect of the present invention comprises a method of scanning a slide so as to form a virtual image thereof. Such a method includes continuously moving one of a slide and an objective along a path in a first direction past the other of the slide and the objective, wherein the slide is supported by a stage. A focus map along the path is formed by focusing the objective with respect to each of a series of portions of the slide disposed along the path by 1) triggering a frame grabber device to capture an image of one of the series of portions of the slide through the objective as the slide moves laterally with respect to the objective, wherein the objective is disposed at a first focus level with respect to the slide; 2) alternatingly with the step of triggering a frame grabber device, triggering the objective to move to a second focus level with respect to the slide after the image of the one of the series of portions of the slide has been captured, with the objective being movable in discrete steps in a range of focus levels, and oscillating back and forth between a minimum focus level and a maximum focus level, wherein the range of focus levels including the first and second focus levels, and the frame grabber device is triggered at a frequency as the slide moves laterally with respect to the objective so that multiple images at different focus levels overlap and such that the one of the series of portions of the slide is common to each of the multiple images, with each image having a contrast value; and 3) determining a maximum contrast value within the plurality of overlapping images, with the maximum contrast value thereby representing an optimum focus level for the one of the series of portions of the slide. The one of the slide and the objective is then continuously moved along the path in a second direction past the other of the slide and the objective, wherein the second direction is opposite to the first direction. For each of the series of portions of the slide along the path, the objective is moved to the optimum focus level determined for that one of the series of portions of the slide and included in the focus map along the path. Once the objective is disposed at the optimum focus level for that one of the series of portions of the slide, a focused image thereof is captured through the objective.

Still another aspect of the present invention comprises a method of capturing a focused image, through an objective, of a slide on a stage, wherein at least one of the objective and the slide is configured to continuously move with respect to the other. Such a method includes continuously moving one of a slide and an objective in a direction past the other of the slide and the objective, wherein the slide is supported by a stage. At least one image of a portion of the slide is captured through the objective with a focus imaging device, as the slide moves laterally with respect to the objective, at a first focus level above a focal plane and at a second level below a focal plane with respect to the slide. A maximum contrast value is determined from the at least one image, with the maximum contrast image thereby representing an optimum focus level for the portion of the slide. A focused image of the portion of the slide is then captured through the objective, with a slide imaging device disposed at least one field of view behind the focus imaging device in the movement direction, as the slide moves laterally with respect to the objective, at the optimum focus level determined from the images captured by the focus imaging device.

Yet another aspect of the present invention comprises a method of capturing a focused image, through an objective, of a slide on a stage. Such a method capturing, with an imaging device, an image of a portion of a sample on the slide, through the objective, at each of a plurality of focus levels about a focal plane with respect to the sample, with the sample being treated with a plurality of dyes. A chromogen separation procedure is then performed on the sample portion image at each of the plurality of focus levels, and a dye space image of the sample portion image is formed at each of the plurality of focus levels for each of the plurality of dyes. For each of the plurality of dyes, the dye space image having a maximum contrast is then selected, with the maximum contrast dye space image thereby representing an optimum focus level for the respective dye in the sample portion image. The optimum focus level dye space images for each of the plurality of dyes are then combined to form an optimum focus sample portion image.

Further, another aspect of the present invention comprises a method of capturing a focused image, through an objective, of a slide on a stage. Such a method includes capturing, with an imaging device, an image of a portion of a sample on the slide, through the objective, at each of a plurality of focus levels about a focal plane with respect to the sample, with the image having a plurality of pixels. A maximum contrast pixel is then selected from the corresponding pixels in the sample portion images at the plurality of focus levels, with the maximum contrast pixel thereby representing an optimum focus level for the respective pixel of the sample portion image. The maximum contrast pixels are then combined to form an optimum focus sample portion image.

Suitable apparatuses for implementing and accomplishing the disclosed methods are also provided, wherein many different apparatus configurations and arrangements may be used, as will be appreciated by one skilled in the art. Accordingly, embodiments of the present invention provide distinct advantages as described and further discussed herein.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 schematically illustrates an apparatus for capturing a focused image, through an objective, of a slide on a continuously moving stage, according to one embodiment of the present invention;

FIG. 2 schematically illustrates one configuration of an apparatus for capturing a focused image, through an objective, of a slide on a continuously moving stage, according to one embodiment of the present invention;

FIG. 3 schematically illustrates a method of extracting a highest contrast image from a stack of images obtained at a series of different focus levels, according to one embodiment of the present invention;

FIG. 4 is a flowchart of a method of extracting a highest contrast image from a stack of images obtained at a series of different focus levels in an image recapture process, according to one embodiment of the present invention;

FIG. 5 schematically illustrates a method of slide scanning by band or stripe, according to one embodiment of the present invention;

FIG. 6 schematically illustrates a method of triggering objective focus and image capture processes for capturing a focused image, through an objective, of a slide on a continuously moving stage, according to one embodiment of the present invention;

FIG. 7 schematically illustrates a method of scanning portions of a slide through capture of a stack of images at different focus levels, through an objective, with the slide being on a continuously moving stage, according to one embodiment of the present invention;

FIG. 8A schematically illustrates a method of evaluating the highest contrast level in each stack of images captured through a scanning process disclosed in FIG. 7, and reconstructing a composite focused image of the slide from the highest contrast images, according to one embodiment of the present invention;

Figure 8B:
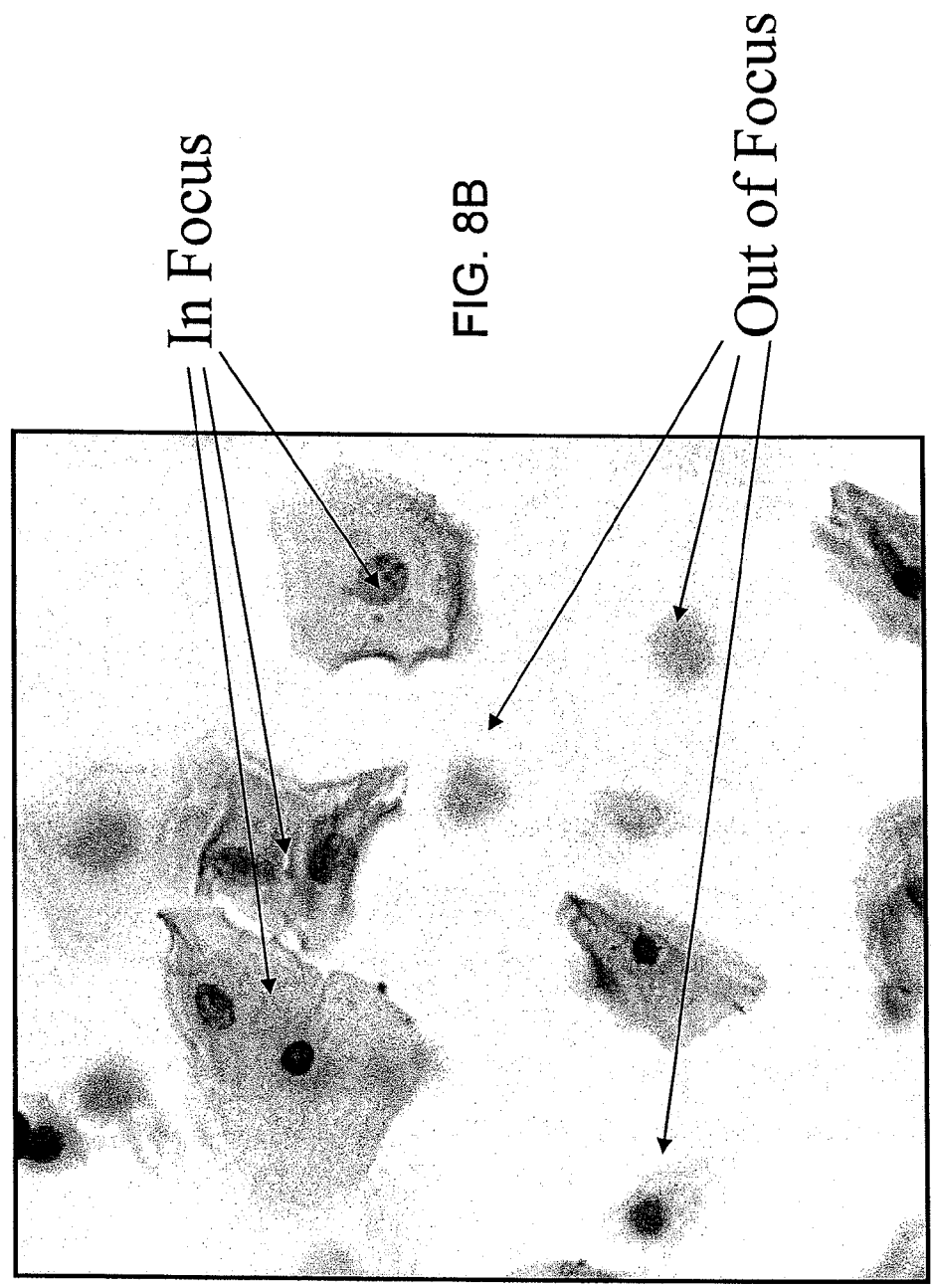
FIG. 8B illustrates one example of the difference in focus on a monolayer PAP cytology specimen within the same field of view, particularly experienced when observing the field of view with a high numerical aperture (i.e., N.A.>0.5)

FIG. 9 schematically illustrates a method of forming a focus map of a portion of a slide using a method of triggering objective focus and image capture processes, through an objective, of a slide on a continuously moving stage, according to the embodiment of the present invention disclosed in FIG. 6;

FIG. 10 schematically illustrates a method of scanning a slide through a dual pass scanning procedure comprising determining a focus map of the slide in one direction along a slide path as disclosed in FIG. 9 and then capturing images of the slide according to the focus map in the reverse direction along the slide path;

FIG. 11 schematically illustrates an apparatus for capturing a pair of images, both above and below a focal plane, in order to implement a method of determining an optimum focus, through an objective, of a slide on a continuously moving stage, according to another embodiment of the present invention;

FIG. 12 schematically illustrates a method of capturing a focused image, through an objective, of a slide on a continuously moving stage by determining an optimum focus with a focus imaging device as disclosed in FIG. 11 and then capturing a focused image at the optimum focus with a slide imaging device disposed behind the focus imaging device in the scan direction, according to one embodiment of the present invention;

FIG. 13 includes images of the above and below focal plane images, and the focused image at the optimum focus, using an apparatus as disclosed in FIG. 11 and a method as disclosed in FIG. 12, according to one embodiment of the present invention;

FIG. 14 schematically illustrates an apparatus implementing a primary camera and a focus camera, for accomplishing a method as disclosed in FIG. 12, according to one embodiment of the present invention;

FIG. 15 schematically illustrates a relationship between the above and below focal plane images and image contrast, as a function of the focus level of the objective with respect to the slide, according to one embodiment of the present invention;

FIG. 16 schematically illustrates multi-plane focus requirements due to different interactions between different dyes and cells of interest;

FIG. 17 schematically illustrates a method of chromogen separation whereby two dye images are created from an RGB color image;

FIGS. 18A and 18B schematically illustrate a method for evaluating an optimum focus in each of the dye spaces, determined according to a chromogen separation method as shown in FIG. 17 and at different focus levels in each dye space (FIG. 18A), according to one embodiment of the present invention, whereby optimum focus level images in each dye space can be combined to produce a best focus image (FIG. 18B);

FIG. 19 schematically illustrates a method of combining the focused images by digitally extending the depth-of-field of a stack of images, wherein two consecutive frames of the same field at different close focus values are combined in accordance with a decision rule whether to detect and keep in the final image the maximum of contrast in each pixel of the image; and FIG. 20 schematically illustrates a method of combining the focused images, as shown in FIG. 19, using a digital wavelet transform.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

I Oscillating Focusing

Embodiments of the present invention are directed to apparatuses and methods for rapid microscopic image focusing that can be used for both static high-resolution object recapture and for continuous motion high-resolution image focusing.

One embodiment of the present invention implements an integrated system 50 as shown, for example, in FIG. 1, that includes a microscope 100 with built-in automation functionalities (e.g., a Zeiss Axiolmager), a motorized stage 150 for the microscope 100, a progressive area scan camera 200 (e.g., a CCD or a CMOS type camera), and a fast focus device 250 (e.g., a PIFOC piezo-objective from Physik Instrument, Germany) in communication with a controller 275. The motorized microscope stage 150 is in communication with a computer device 300 via a controller 350, while the camera 200 is also in communication with the computer device 300 via a controller, such as a frame-grabber device, wherein, in one embodiment, such a controller may be integrated or combined with the controller 275 for the fast focus device 250, as shown in FIG. 1. One skilled in the art will appreciate, however, that the objective of the microscope 100 may be configured to move with respect to a stationary stage 150 and/or the slide to be examined may be configured to be movable with respect to a stationary objective and, as such, the configurations of an integrated system 50 disclosed herein are merely examples of possible configurations thereof.

The progressive area scan camera 200 is, for example, a color camera capable of acquiring a full image at a time so that image jitter for moving objects is substantially eliminated. Such a camera 200 generally includes an integrated shutter function, which allows electronic adjustment of exposure times within a wide range, which allows the movement of a passing object to be optically frozen without expensive strobe illumination. In order to optimize the progressive scan, the camera 200 may be configured to run an asynchronous reset mode or any other suitable mode capable of optimizing the progressive scan procedure.

In one embodiment, the fast focus device 250, such as a piezo-objective, can be, for example, a microscope objective nano-focusing device with travel ranges from between about 100 μm and about 500 μm, with sub-nanometer resolution. Such a device is screwed on the objective turret in a regular objective slot. The objective is then screwed on the objective holder of the nano-focusing device. Such nano-focusing devices are relatively faster and more accurate than regular focus devices (50 μm step—1% accuracy—in less than 10 ms). There are several ways to control (move up/down) such a piezo-objective. One way is to send a RS-232 or USB command to the controller 275 to move the piezo-objective up or down. Sending and interpreting the command can take, for example, several milliseconds. However, in some instances, such a method of control may be too slow and cannot be effectively used.

Accordingly, one embodiment of the present invention implements a particular electronic controller to control and activate the piezo-objective with the necessary speed to provide efficient focusing during the scanning procedure, while allowing two modes of operation. Though one configuration is described herein, one skilled in the art will appreciate that the functions of such a controller may be accomplished in many different manners, and the configuration disclosed herein is but one such example of an appropriate configuration.

In a static re-location mode, a Digital to Analog Converter (DAC) type controller 275 controlled by the computer device 300 forces the piezo-objective to run a continuous triangular or other continuous sinusoidal wave. The DAC controller 275 determines the shape, the frequency and the dynamics of the wave. At pre-defined voltage values along that wave, the DAC controller 275 pulses out TTL triggers to start the image acquisition, whereby images are acquired by the camera 200 through a direct connection to the frame-grabber device. More particularly, one embodiment of such an electronic controller 275 is a modified sound card of the computer device 300 that acts as a digital to analog converter (DAC) and an amplification layer to match the required voltage (see, e.g., FIG. 2). The amplification layer of the electronic controller 275 has 2 independent channels that are connected respectively to the piezo-objective (DAC) and the frame-grabber/camera 200 (TTL trigger out). The channel of the electronic controller 275 connected to the piezo-objective generates oscillations (wave forms) that can be adjusted in frequency and amplitude by sending appropriate software commands to the sound card (i.e., MS Windows Direct Sound API). The channel of the electronic controller 275 connected to the frame-grabber/camera 200 generates compatible TTL triggers (N=5, 9 or 17) with a lock up (synchronization) mechanism. For example, when N=9, 9 pulses are sent to the frame-grabber/camera 200 as the piezo-objective is moved according to half of a wave cycle (min to max). The amplitude is determined according to the depth-of-field of the particular magnifying objective in use and the desired focusing accuracy.

In a dynamic focusing mode (i.e., focusing the piezo-objective during continuous stage motion), the controller 275, is set by the RS232 or USB connection, in slave mode. N (N=5, 9, 17) predefined values are disposed on a triangular wave. As such, each increment of the piezo-objective to the next value on the wave is operated by a TTL trigger IN signal sent by the frame grabber after the previous image acquisition by the camera 200. The frame-grabber triggers the image acquisition by the camera 200 when receiving a TTL trigger IN signal from the stage 150 running in continuous motion. The wave amplitude and the number of predefined values are adjusted according to the depth-of-field of the particular magnifying objective in use and the desired focusing accuracy. The stage 150 (master), the frame-grabber/camera 200 (slave) and the piezo-objective (slave) are synchronized independently of the speed of motion of the stage 150, as long as the piezo-objective and camera frame-rate are compatible with the triggering frequency.

I.1 High Resolution Object Recapture

In the static mode of operation (high resolution object recapture), the motorized stage 150 moves to the X, Y coordinates of a selected object, while the built-in fast focus device 250 moves the piezo-objective to a stored position corresponding to the particular magnifying objective in use. Once the X, Y, and Z axes are stabilized, the system 50 can collect a dynamic stack of images that are acquired by the camera 200 at N (i.e., N=10) times the frequency of the piezo-objective oscillation, and the focusing oscillation is not stopped as the stage moves from one position to another.

For each image of the stack, a digital operator such as the variance is used to evaluate the contrast, as shown in FIG. 3. The image exhibiting the highest value of contrast is kept as the best focus image at the X, Y position. When running the piezo-objective at a frequency of about 5 Hz, the camera 200 grabs images at a frequency of about 50 Hz. The focus is thereby evaluated out of 10 images by the system 50 as fast as 50 frames/sec (1 full cycle=200 msec). In this mode, the exact value of contrast along the focus axis (Z axis) is not particularly necessary since obtaining only the best-focused image is of interest. The depth-of-field of a 20× objective (NA 0.5) equals about 2.5 µm and, at this magnification, a z-stack of 15 µm (10 images, 1.5 µm step size) is typically used. If the optimum focal plane is not "bracketed" by the z-stack (i.e., if the optimal focal plane does not fall within the magnitude of the range of focus levels, either by the relative contrast evaluation or through a threshold determination), the highest contrast image of the first and the last image index (0 or N) of the particular z-stack is determined. In such a situation, the initially stored Z-position for the microscope objective is too far off the focal plane at the selected X, Y position (i.e., slide tilt not correctly compensated). As such, the system 50 increments the built-in fast focus device 250 position by the size or magnitude of the z-stack (i.e., shifts the fast focus device 250 position by the magnitude of the focal range) in the direction of the previous highest contrast image (index 0 or N), wherein the piezo-objective is not stopped during the Z-position repositioning. As soon as the Z-axis (the built-in fast focus device 250) is stabilized, the highest-contrast image is extracted from the newly-obtained z-stack, as shown in FIG. 4.

I.2 Direct High Resolution Scanning

In the continuous motion mode, the motorized stage 150 scans the slide by the camera 200/piezo-objective in a pattern of sequential adjacent stripes. The number of bands depends on the size of the camera sensor and the overlap between the stripes required by the application, as shown in FIG. 5. Before the acquisition of a stripe, the oscillation of the piezo-objective is initiated in accordance with the triangular wave, and the camera 200 acquires images with the scheme described in FIG. 6. During the stripe acquisition, the motorized stage 150 moves along one axis (i.e., the X-axis) at a given speed, and the stage controller 350 delivers pulses (i.e., TTL triggers) to the frame-grabber at predefined intervals. As a consequence, the system 50 accumulates image stacks with a fixed offset between the images in a particular stack. Because of the offset between the images, the contrast cannot be compared from one image (or plane) to another on the entire image. That is, only the overlapped part of the images can be used for focusing, as shown in FIG. 7. The offset is dependent on the size of the stack (i.e., the number of planes) and the size of the camera sensor.

When the offset is adjusted so that $$\text{Offset} = \frac{Fieldsize}{2*(Stacksize - 1)},$$

a complete stack containing a half field-size image is available for focus evaluation every half field. A series of adjacent stacks is then processed so that the best-focused image is extracted from each stack according to the same contrast detection algorithm described earlier (i.e., variance, first-derivative, local contrast). The adjacent best-focused images can subsequently be tiled together to obtain one unique digital image of the given stripe (i.e., a virtual slide). The series of focused images can also be used in rare event detection for individual field of view data extraction without the tiling operation.

The width of each stripe is defined by the Y-dimension ($D_y$) of the sensor portion of the camera 200, the magnification factor (M) of the selected microscope optics creating the analog image on the camera sensor, and a chosen overlap area ($O_y$) between two adjacent bands necessary for the correct alignment of the bands to form a complete image. The X-direction is defined, in this example, as the direction in which the stage 150 moves during the scanning process of acquiring images to create a complete stripe, while the Y-direction is orthogonal to the X-direction within the object plane. As such, given the scan area S with the dimensions x and y:

$$S = x \cdot y$$

and the number of bands ($N_{stripe}$) needed to cover S is defined as:

$$N_{stripe} = \frac{M \cdot y}{D_y \cdot \left(1 - \frac{O_y}{N_y}\right)}$$

Using an example of a scan implementing an objective with magnification M=20 to cover a scan area with dimensions x=13.5 mm and y=13.5 mm with a typical overlap between adjacent bands of $O_y$=40 pixels and a ⅔" 3CCD progressive scan camera 200 with chip (sensor) dimension in Y-direction $D_y$=7.2 mm and pixel resolution of $N_x \times N_y$=1024×1024 pixel, the number of bands that must be computed is about 40.

Generally, any array-type camera 200 is suitable for implementation in the method, though the number of bands and the overall time of performance of the method is directly affected by the size of the camera sensor. The stripes or bands are scanned following a unidirectional pattern. During the acquisition of a stripe, the stage 150 moves at constant speed $V_{stage}$. The speed of the stage 150 is directly dependent on the X-dimension ($D_x$) of the camera sensor, the magnification (M), the depth of the stack ($N_{image}$), and the frame capture rate of the camera 200 ($Camera_{rate}$).

$$Offset = \frac{D_x}{M \cdot 2 \cdot N_{image}}$$

Using the example of a scan with magnification M=20, $N_{image}$=7 images per stack, and a ⅔" 3CCD progressive scan camera 200 with chip dimension in the X-direction $D_x$=9.6 m, the offset equals 34 μm, and one image is acquired at every offset in the X-dimension.

$$V_{stage} = Offset \cdot Camera_{rate}$$

At a camera frame-rate of 100 images/sec, the speed of the stage equals 3.4 mm in the same time period (1 sec).

The overall time of scanning ($T_{scan}$) is calculated as followed:

$$T_{scan} = N_{stripe} \cdot \left(\frac{x}{V_{stage}}\right)$$

With the settings described in the above example, $T_{scan}$=154 seconds (<3 minutes). The processing time between 2 successive images is thus 10 msec at 100 images/sec. This timing can be important for efficient real time image processing (i.e., contrast evaluation, shading correction, etc.). Therefore, the stacks are processed in a separate thread with a slight delay (half a field) and immediately made available for the other thread for image storage, image tiling or data extraction as required by the application.

This described method can be used at many magnifications (i.e., 10×, 20×, and 40×). Generally, the piezo-objective is attached to a single objective at a time. As such, if the application requires the method to be run on 2 different magnifications (i.e., 10× and 20×), the optical path can be equipped with a zoom lens (for example, Zeiss Optovar) so that an equivalent 20× magnification is obtained by using simultaneously the 10× objective and 2× zoom.

The contrast evaluation is processed for each image in the stack on the overlapped portion of the images (i.e., half field). For extended accuracy, the stack can be subdivided so that the contrast is evaluated on a sub-image, as shown in FIG. 8A, without changing the acquisition process. Such a process makes it possible to display or process focused objects of interest belonging to the same field of view (half the field of view seen by the camera 200) even if such objects were not sharing the focal plane (See FIG. 7). When sub-images are used, the contrast evaluation procedure must implement, for example, a low-pass filter, in order to reduce "step effects" between sub-images. That is, in monolayer cytology slide scanning, a pseudo-3D effect in the fields of view may be realized when observing the slide at high numerical aperture (i.e., N.A.>0.5) due to the small depth of field. This pseudo-3D effect leads to a situation where it may not be possible to have the entirety of the object of interest focused in the field of view (see, e.g., FIG. 8B). The contrast evaluation is thus performed on the entire field of view so as to provide an image at an "average" focal plane.

Figure 8C:
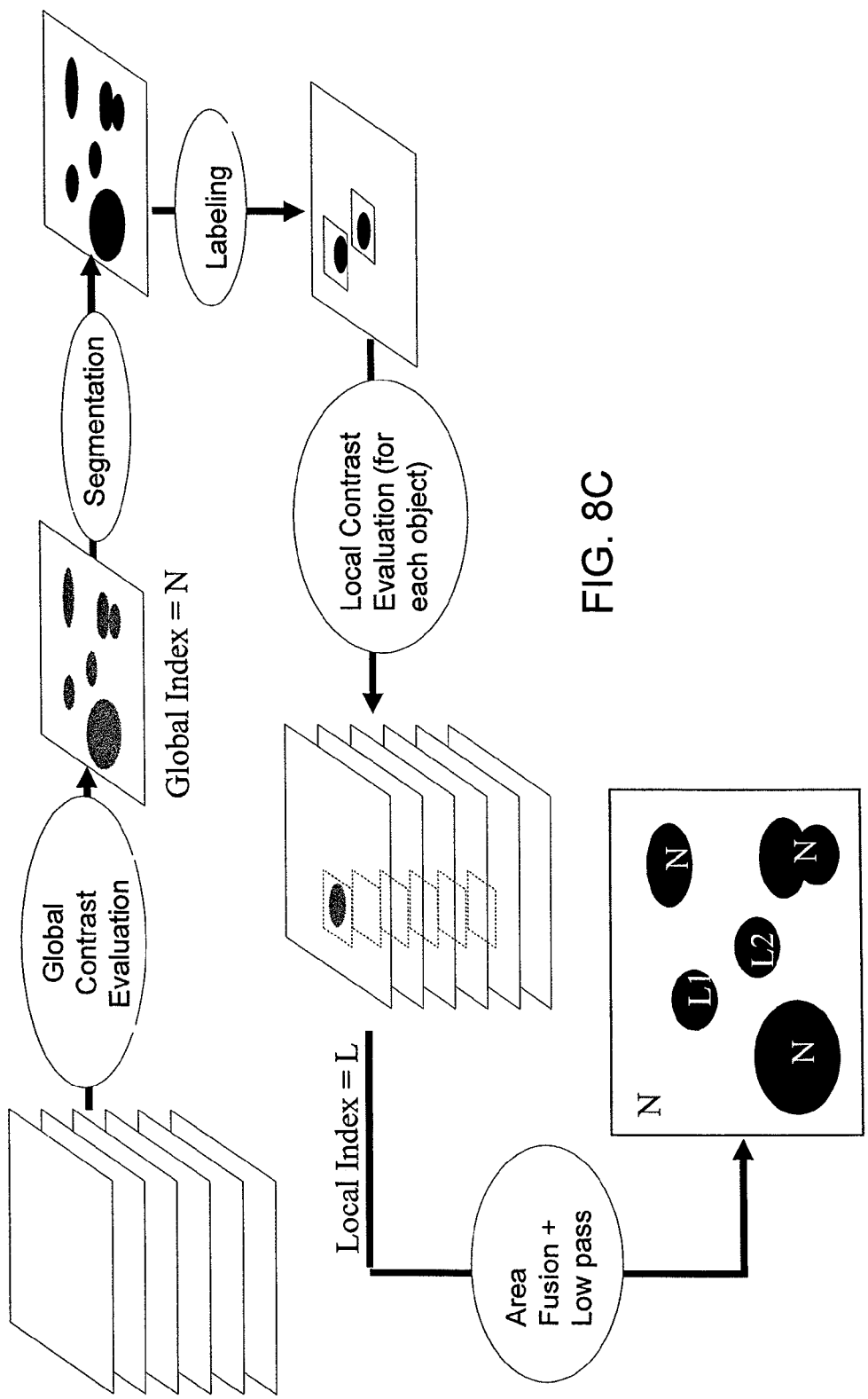
FIG. 8C illustrates a method of optimizing the contrast stack evaluation by detecting out-of-focus objects of interest, evaluating local contrast, and then forming a fused image.

In a rare event detection application (i.e., Pap scanning), only a subset of the cells within the sample are of interest. As such, in such applications, in order to enhance the focusing accuracy, a procedure as shown, for example, in FIG. 8C, may be applied to bring some of the cells of interest into focus with the remainder of the field of view. More particularly, once a stack has been grabbed, the global contrast is evaluated and the corresponding image index in the stack is identified. A threshold segmentation procedure is then applied to separate the background of the image from the object of interest. An image labeling procedure is then applied to sort objects of interest according to various criteria such as, for example, size and shape factor. Through corresponding rectangles (i.e., left, top, right, bottom object coordinates), local contrasts are evaluated for each object of interest selected and retained by the image labeling procedure. The local contrast evaluation is associated with an image stack index, and may be different from the global contrast evaluation. The final image for the current field of view is then built by fusing pixels from the image selected by the global contrast evaluation and the pixels determined locally through the local contrast evaluation, with a low-pass filter being applied to reduce any local step effects around any object of interest brought back in focus through such a procedure. In some instances, such a procedure can be combined, for example, a chromogen separation procedure (see, e.g., U.S. Patent Application Publication Nos. US 2003/0138140 and/or US 2003/0091221, each to Marcelpoil et al.) to allow certain types of cells (i.e., DAB marked cells as opposed to unmarked cells) to be selected with increased accuracy.

I.3 Dual-Pass High Resolution Scanning

Another way to use the apparatus 50 is to adjust the offset so that $$\text{Offset} = \frac{\textit{Fieldsize}}{\textit{Stacksize}}$$

In such a case, a complete stack is available for focus evaluation every field of view. However, the images are only equal to the size of the offset, and there are gaps between the stacks, as shown in FIG. 9. Accordingly, this configuration may not be suitable for direct high resolution scanning as described above.

However, this configuration can first be used to perform a first scan to build a dynamic focus map along the main axis of the stripe. This focus map is then used to perform a regular progressive scan with focus adaptation in a reverse direction along the same stripe, as shown in FIG. 10. This approach efficiently replaces and provides a significant improvement over a method of placing random seeds all over the specimen to be scanned and building a static 3D focus map with classical interpolation methods.

In this configuration, the Z-value corresponding to the highest-contrast in the stack is extracted, but this Z-value does not necessarily correspond to one of the images of the stack. For example, an interpolation method (i.e. spline) can be used to fine-estimate the contrast maximum. Since there is no image extracted out-of-the stack, the camera 200 can run with a lower spatial resolution and with a limited number of colors. For higher accuracy requirements, the dynamic focus map can be combined with the first direct high resolution scanning method previously described.

II Predictive Dual Mirror Auto-Focusing

Another embodiment of the present invention implements a method using an integrated system 50 comprising a microscope 100 with built-in automation functionalities (for example, Zeiss Axiolmager), a motorized stage 150, a progressive area scan camera 200 (CCD or CMOS), a fast focus device 250 (i.e., PIFOC piezo-objective from Physik Instrument, Germany), and an optical device 450 (as shown in FIG. 11) having a tube member (not shown) and an optical bench (not shown). The tube member includes an aperture 525 that serves as a field stop, and one or more lenses 550 for focusing and/or recollimating the incoming light. The optical bench supports a focus camera 600, a pair of beam-splitters 650*a*, 650*b*, and a pair of mirrors 700*a*, 700*b* for splitting and recombining the light, and lenses 750*a*, 750*b* for focusing the light onto the CCD of the focus camera 600.

Generally, a single camera 200 and the optical device 450, such as the image splitter mechanism described above, are used to obtain two separate images. Those two images, while covering the same field of view are focused at different elevations (Z– and Z+). By comparing image contrast features, the elevation of best focus for the primary camera can be determined. To make this focus evaluation compatible with a continuous motion scanning approach, the focus camera 600 "looks ahead" in the scan direction at a field of view that has not yet been acquired by the primary camera 200, as shown in FIG. 12. To do so, the aperture 525 (see field stop of FIG. 11) is off-center by one magnified field of view, so that the focus image covers a field of view adjacent to the one being acquired by the primary camera 200.

II.2 Hardware Description

In one embodiment, the required object size is at least 360 µm×480 µm, which corresponds, for example, to a ⅓" CCD camera 200 shooting a scene at 10× magnification. The focus system magnification is roughly 78% of the primary magnification. This is required in order to fit two images onto a single image sensor and still leave additional room on the sensor to accommodate any misregistration between the primary and focus images. Thus, in actuality, the focus magnification is about 7.8× when the primary magnification is 10×.

An aperture 525 is required and acts as a field stop, preventing the two images from overlapping when focused onto the CCD image sensor. In order to fit two images compatible with the ⅓" format (3.6 mm×4.8 mm) of the primary camera 200 onto the ½" sensor (4.8 mm×6.4 mm) of the focus camera 600, the magnification in the focus system must be reduced to no more than about 88% of the primary system magnification. By doing so, and by using a field stop, each focus image is reduced to a width of about 3.2 mm, corresponding to an object width of 0.36 mm at 8.9× magnification. The image height may be as small as about 4.3 mm, corresponding to an object height of about 0.48 mm at 8.9× magnification. The length of the image may be greater to accommodate misregistration between the primary and focus images in the Y-direction. In addition, the magnification may be less than 8.9× to allow for misregistration between the primary and focus images in the X-direction. The focus magnification is thus roughly 78% of the primary magnification.

The processing zones of the two half images on the auto-focus camera 200 must be adjusted, as shown in FIG. 13, to make sure that the two zones correspond to or "see" the same portion of the scene. In one embodiment, there is no magnification difference between the two half images, but only a translation (X, Y) due to the misalignment of the mirrors along the two optical paths. This translation is estimated by performing an autocorrelation operation, which can be performed only if the two images show approximately the same level of contrast. The primary camera is first focused and, once the translation (X. Y) is estimated, the two zones are optimized in size to cover the maximum surface of the scene.

The primary camera 200 is a color camera that grabs a true color image for further processing while the focus camera 600 is black & white camera for focus evaluation. Both cameras 200, 600 are configured to grab a field at the same time by, for example, connecting both cameras 200, 600 to the same frame-grabber and then implementing a rapid channel switching to alternatively grab each image. In the alternative, a dual frame-grabber architecture can be used, as shown in FIG. 14, where one embodiment uses, for example, a Matrox Meteor II/MC for the primary camera 200 and a Matrox Meteor II for the auto-focus camera 600. The cameras 200, 600 are "gen-locked" to allow substantially exact synchronous grabs. Gen-locking indicates that both cameras 200, 600 share the same video standard (PAL or NTSC).

II.2 Algorithm Description

The instant focus algorithm is based on the assumption that the differential contrast is a linear function of Z between Z (F+) and Z (F−):

$$F(z) = \frac{(Cont_{ZF+} - Cont_{ZF-})}{(Cont_{ZF+} + Cont_{ZF-})}$$

This function is linear between F+ and F−, as shown in FIG. 15, and this range is limited by the optical adjustment. One suitable range setting for the 10× magnification is, for example, 40 µm. A larger range may lead to, for instance, some undesired non-linearity over the curve between F+ and F−. Because the two optical paths (F+ and F−) are not exactly identical (due to, for example, magnification, mirror orientation, misalignment, etc.), the two curves (F+ and F−) tend not to have the same maximum, though this can be corrected by applying a shading correction.

Since the portion of the contrast function curve between F+ and F− is close to be linear, the ultimate or optimal focal plane can be retrieved by applying the linear function (constant~0):

$$Z_{Focus} = (Slope * Contrast) + Constant$$

In practice, the slope may be obtained through a pre-calibration process on a slide test. Because of the inflexions on the maximum and minimum of the contrast function, the slope is calculated slightly inside the range, which slightly reduces the range of operation. However, the slightly reduced range of operation is compensated for by a more accurate focus estimation.

There are multiple methods for estimating the contrast of a scene using, for example, the variance, the histogram range, the entropy, the LaPlacian, etc. For example:

Variance:

$$Var = \frac{1}{N} \sum (x - \bar{x})^2$$

First Derivative:

$$FD = \Sigma(x_n - x_{n+1})$$

Because the focus position is calculated a field in advance during the band or stripe scanning procedure, the piezo-objective can be updated with the new focus position (a field in advance) while the stage 150 is moving from one field to the next, while maintaining optimum focus along the band. A piezo-objective has been found to be very effective in allowing the focus to be performed sufficiently fast.

III. Chromogen Separated Autofocusing Method

In protein expression analyses, immunohistochemistry ("IHC") and immunocytochemistry ("ICC") techniques, for example, may be used. IHC is the application of immunochemistry to tissue sections, whereas ICC is the application of immunochemistry to cultured cells or tissue imprints after they have undergone specific cytological preparations such as, for example, liquid-based preparations. Immunochemistry is a family of techniques based on the use of a specific antibody, wherein antibodies are used to specifically target molecules inside or on the surface of cells. The antibody typically contains a marker that will undergo a biochemical reaction, and thereby experience a change of color, upon encountering the targeted molecules. As such, chromogens of different colors can be used to distinguish among the different markers.

During relocation of an object of interest on a slide, variation of focal planes between dyes (Hematoxylin and DAB, for instance) can be observed in the objects (i.e., cells) to be relocated as shown, for example, in FIG. 16. In such an instance, the DAB is fixed to the cell through an enzymatic reaction when binding to the antibody of interest (i.e., protein). The result of this reaction is an enzymatic precipitate that occurs on the top of the cell, while the counterstaining (i.e., Hematoxylin) binds acidic components within (inside) the cell. The difference in focus between the DAB and Hematoxylin sites is on the order of about 1 or 2 microns, and is generally visible only when the depth-of-field of the objective is close to that measurement. This may be the case when using a 20×/0.5 NA objective, for instance.

When a color CCD digital camera is used to image the sample, three gray level images of the sample are simultaneously captured and obtained (each gray level image corresponds to the respective Red, Green and Blue channel (RGB)). Chromogen separation techniques such as disclosed, for example, in U.S. Patent Application Publication No. US 2003/0138140 and/or US 2003/0091221, each to Marcelpoil et al. (see, e.g., FIG. 17), can then be applied to the image(s). As such, the optical density of each molecular species can be evaluated (as revealed by the chromogen or dye associated with each molecular species) in any location of the image, generally on a per pixel level. On the biological sample, the markers and counterstain generally indicate the dyes of interest to be detected and quantified.

The concentration of the molecular specie can thus be determined from a color image of the sample. In a videomicroscopy system equipped with a 3CCD camera, the image should generally be balanced and normalized according to an empty field white reference and a black field image, and also corrected for shading. In addition, the image is spatially corrected for chromatic aberrations, channel by channel. Once the image is obtained, an optical density of the sample is computed in each of the red, green, and blue channels of the RGB image at a particular pixel in the image from the measured light transmitted through the sample. A corresponding optical density vector is thereafter formed for that pixel. The optical density vector is then multiplied by the inverse of a relative absorption coefficient matrix of the dyes present in the sample so as to form a resultant vector for the pixel, representing the optical density contribution from each dye. The relative absorption coefficient matrix comprises a relative absorption coefficient for each dye (marker(s) and counterstain(s)) used in the sample preparation protocol, in each of the red, green, and blue channels. The resultant vector thus comprises the concentration of the molecular species, as indicated by the respective marker(s), and by the counterstain(s), for that pixel.

Such imaging techniques, also known as multi-spectral imaging techniques, when adapted to color imaging (RGB camera), allow a substantially real time (video rate) processing of the sample (typically, for example, about 40 millisecond per frame), which provides an advantage. For speed issues and real time processing, or displaying purposes in case of the use of an RGB camera, the acquisition through the different channels is performed in parallel and look up tables (LUT) can be generated which map the RGB color input values to pre-computed concentrations and/or transmittances of each of the involved dyes.

Thus, another aspect of the present invention implements the focusing technique(s) disclosed herein to determine the optimum focal position or focus level of both the marker and the counterstain (i.e., DAB and Hematoxylin) resulting from chromogen separation techniques and to combine together the two corresponding optimum focal planes of the marker and counterstain to obtain a unique optimum focus image of the sample, as shown in FIG. 17. In order to detect or determine the focal position that corresponds to the highest contrast image out of a series of images, a hill-climbing or a z-stacking approach, for example, can be used. Once the optimum focus images of both the marker and counterstain are determined, the two focused images can be combined by summing, on a per pixel basis, the optical densities (OD) according the Lambert-Beer law, as shown in FIGS. 18A and 18B.

In the alternative, the combination of the focused images can be performed using a method that digitally extends the depth-of-field of a stack of images ("extended focus"), as shown, for example, in FIG. 19. More particularly, two consecutive frames of the same field at different close focus values can be combined or fused, wherein the fusion is performed in accordance with a decision rule whether to detect and keep in the final image the maximum of contrast in each pixel of the image. One such implementation is based on a digital wavelet transform as shown, for example, in FIG. 20. In general, the offset (focus difference) between the dyes (marker and counterstain) is almost constant from one field of view to another. As such, once the focus is determined, the relocation process for objects of interest on a slide can be accelerated, in some instances, by performing the optimum focus evaluation on one dye and then applying the focus offset to determine the best focus image in the other dye of interest.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of capturing a focused image, through an objective, of a slide on a stage, comprising:
    capturing, with an imaging device, an image of a portion of a sample on the slide, through the objective, at each of a plurality of focus levels about a focal plane with respect to the sample, the image having a plurality of pixels;
    selecting a maximum contrast pixel from the corresponding pixels in the sample portion images at each of the plurality of focus levels, the maximum contrast pixel thereby representing an optimum focus level for the respective pixel of the sample portion image; and
    combining the maximum contrast pixels to form an optimum focus sample portion image.

2. A method according to claim 1 wherein combining the maximum contrast pixels further comprises combining the maximum contrast pixels via a digital wavelet transformation.

* * * * *